United States Patent
Brown

(10) Patent No.: US 8,542,233 B2
(45) Date of Patent: Sep. 24, 2013

(54) SYSTEMS AND METHODS FOR PHOTOGRAMMETRIC RENDERING

(76) Inventor: Battle M. Brown, Pittsburgh, PA (US)

( * ) Notice: Subject to any disclaimer, the term of this patent is extended or adjusted under 35 U.S.C. 154(b) by 0 days.

(21) Appl. No.: 13/476,703

(22) Filed: May 21, 2012

(65) Prior Publication Data

US 2012/0229465 A1    Sep. 13, 2012

Related U.S. Application Data

(63) Continuation of application No. 11/800,159, filed on May 4, 2007, now Pat. No. 8,194,074.

(60) Provisional application No. 60/797,511, filed on May 4, 2006.

(51) Int. Cl.
| G06T 17/00 | (2006.01) |
| G09G 5/00 | (2006.01) |
| G06K 9/40 | (2006.01) |
| G06K 9/36 | (2006.01) |

(52) U.S. Cl.
USPC .......... 345/428; 345/581; 345/582; 345/617; 382/263; 382/266; 382/286

(58) Field of Classification Search
None
See application file for complete search history.

(56) References Cited

U.S. PATENT DOCUMENTS

| 5,485,568 A | 1/1996 | Venable et al. |
| 5,790,713 A | 8/1998 | Kamada et al. |
| 5,847,712 A | 12/1998 | Salesin et al. |
| 7,619,663 B2 | 11/2009 | Sakurai et al. |
| 2003/0161530 A1 | 8/2003 | Yamada et al. |
| 2004/0081363 A1 | 4/2004 | Gindele et al. |
| 2004/0170337 A1 | 9/2004 | Simon et al. |
| 2005/0190991 A1 | 9/2005 | McCleese |
| 2006/0036944 A1* | 2/2006 | Wilson .......................... 715/702 |
| 2006/0291747 A1 | 12/2006 | Peterson |

OTHER PUBLICATIONS

Chong A.K., et al., "Digital architectural photogrammetric recording of historical buildings and monuments", New Zealand Surveyor, Issue No. 293, pp. 25-28, Jun. 2003.*

Miller, S.B. et al. "A line of high performance digital photogrammetric workstations—The synergy of General Dynamics, Helava Associates, and Leica", International Archives of Photogrammetry and Remote Sensing, Kyoto, Japan, 1992, vol. 29, Part B2, pp. 87-94.*

(Continued)

Primary Examiner — Maurice L McDowell, Jr.
Assistant Examiner — Donna Ricks
(74) Attorney, Agent, or Firm — Kramer Levin Naftalis & Frankel LLP

(57) ABSTRACT

Systems and methods are provided for producing a rendered drawing or rendering from a detailed image of an object (e.g. photograph) resulting in a rendering that is photogrammetric and that preserves detail in the said image of said object. The combination of the metric nature and image detail preservation in a rendering resulting from the process enhances the usefulness of the rendering to users. The invention is useful in particular for large format renderings such as wire frame style drawings used for blueprints in the architecture, engineering and construction industry (AEC industry) when used for existing structures. The processes combine graphic arts techniques with photogrammetric techniques to preserve, fully or partially, information about an object as captured in image detail of said object and to present said information in photogrammetrically correct rendering, which rendering may be incorporated into drawings useful to and/or familiar to end users of said drawings.

12 Claims, 20 Drawing Sheets

(56) References Cited

OTHER PUBLICATIONS

Haala, N., "Processing of 3D building models for location aware applications", ISPRS Commission III Symposium, International Archives on Photogrammetry and Remote Sensing, 2002, vol. 34, No. 3, pp. 138-143.*

Grammatikopoulos L. et al., 2004. "On automatic orthoprojection and texture-mapping of 3D surface models". International Archives Photogrammetry & Remote Sensing, Istanbul, Turkey, 35 (5), Jul. 12-23, 2004, pp. 360-365.*

P. Debevec, et al., Modeling and rendering architecture from photographs: a hybrid geometry- and image-based approach, University of California at Berkeley, Berkeley, CA, 1996.

S.B. Miller et al., A line of high performance digital photogrammetric workstations—synergy of General Dynamics, Helava Associates, and Leica, International Archives of Photogrammetry and Remote Sensing, Kyoto, Japan, vol. 29, Part B2, 1992, pp. 87-94.

G. Pomaska, et al., Implementation of digital 3D-Models in building surveys based on multi image photogrammetry, International Archives of Photogrammetry and Remote Sensing XXXI (1996), pp. 487-492 Part B5.

G. Pomaska, Automated processing of digital image data in architectural surveying. Proc. of ISPRS Commission V Symposium, Hakodate, Japan. International Archives of Photogrammetry and Remote Sensing, vol. 32, Part 5, 1998, pp. 637-642.

Poulin, P. et al., Interactively Modeling with Photogrammetry, In Eurographics Workshop on Rendering, 1998.

C. Poullis et al., Photogrammetric modeling and image-based rendering for rapid virtual environment creation. Proceedings of ASC2004, 2004.

Straforini, M. et al, The Recovery and Understanding of a Line Drawing from Indoor Scenes, IEEE Transactions on Pattern Analysis and Machine Intelligence, vol. 14, No. 2, Feb. 1992.

* cited by examiner

910

920

930

940

950

960

970

980

SYSTEMS AND METHODS FOR PHOTOGRAMMETRIC RENDERING

CROSS-REFERENCE TO RELATED APPLICATION

This application is a continuation of U.S. patent application Ser. No. 11/800,159, filed on May 4, 2007, which claims the benefit of U.S. Provisional Patent Application No. 60/797,511, filed on May 4, 2006, both of which are hereby incorporated by reference herein in their entirety.

BACKGROUND OF THE INVENTION

Traditional 3D computer models, color laser printing, and photogrammetric based maps and images have provided photographic and other forms of representations of buildings, terrain, objects, and artifacts.

Traditional drawings used in the architecture, engineering and construction industry (AEC industry) take the form of blueprints. Traditional blueprints are one-color print documents of an object. Traditional blueprints provide one-color line drawings that use a wire frame representation of an object and are also sometimes referred to as "line art" or "spot color" in the graphics art industry. Such traditional drawings may be adequate in the AEC industry for new constructions as the object of the drawing may not yet exist (i.e., may not yet be constructed). Such traditional blueprints and line art drawings, however, are deficient as such traditional drawings only provide minimal information in the wire frame about the object. It is therefore desirable to provide line drawings with enhanced detail.

Traditional photogrammetric techniques for the AEC industry produce rectified and orthogonally corrected images ("orthophotos" or "orthoimages"), partially rectified, or unrectified images that may be converted into two Dimensional (2D) wire frame models primarily through manual processes on a drafting board or partially manual processes with the aid of a computer assisted drafting board or computer tableau (e.g., CAD/CAM).

Additionally, traditional photogrammetric techniques can be used with CAD/CAM to produce three dimensional (3D) models in either wire frame or textured surface models. Such models can be used for buildings and other objects. End-user blueprints in some cases cannot be created from these techniques, however. As a result, these techniques are deficient. For example, 3D models are difficult to depict in a visually useful way on a 2D surface (e.g., paper) and textured surface models are in a continuous, black and white tone that does not reproduce well by blueprint, fax, and photo copy commonly used in the AEC industry.

Traditional models and images also tend to be relatively large in file size and consume large amounts of storage space and transmission bandwidth. 2D wire frame models, while easy to reproduce as blueprints, have eliminated much useful information from original photographic or other images. Accordingly, blueprints that provide only line art in one color are widely used due to the deficiencies of such 2D and 3D models but are yet still deficient in their own right.

As discussed above, traditional drawings used in the AEC industry of existing structures are wire frame style line art drawings produced as blueprints. After a structure is built, drawings are traditionally redrafted to reflect the structure in its "as-built" condition. Large format photocopiers are used in the AEC industry to produce "record drawings" of newly completed structures when hand written notations on "working drawings" of completed projects must be preserved in multiple copies for architects, owners, and contractors.

Redrafting projects using CAD/CAM to as-built conditions, however, is labor intensive and costly. Detailed features (e.g., stone masonry joints or facade surface detail) is not included in "as-built" drawings because of the difficulty of creating accurate images by traditional CAD/CAM methods, difficulty or impossibility of displaying information in blueprint form, costs, and other factors.

FIG. 1 shows prior art manual process 100 that manually takes information from field measurements of a physical object (e.g., step 110) and metric photography (e.g., step 112). Information from both these sources is then merged in a manual process (e.g., step 114) to prepare a CAD/CAM drawings production (e.g., step 116). During/after the preparation of some/all of a CAD/CAM drawing of an object, measurements on the drawing are manually correlated with the field measurements taken of the object (e.g., step 118). Manually gathering field measurements and manually matching field measurements to the drawing scale is labor intensive. The manual process produces a wire frame style drawing (e.g., in step 199) that is a 2D drawing. Such a 2D drawing is reproduced in a one-color blueprint representation of the object. Such a process is deficient as each of the several steps of gathering field measurements, merging photographic information with physical measurements, cross-checking scale drawings to field measurements, and the actual production of the CAD/CAM drawing itself is labor intensive. It is therefore desirable to provide a less labor intensive process of fabricating drawings.

A prior art processed image is shown in image 1100 of FIG. 11, which is absent of detail of stone texture 1012 of FIG. 10 (loss of detail 1112) and paint drops 1014 of FIG. 10 (loss of detail 1114). Also it is difficult to determine if area 1118 on FIG. 11 is masonry or wood. One skilled in the art would likely determine that area 1112 in FIG. 11 is the wood sill of the window and based on its proximity and the form factor of the abutment to 1118, that 1118 is probably wood trim exterior framing. Such a non-definite determination, however, is disadvantageous.

SUMMARY OF THE INVENTION

Systems and methods are provided for producing a rendered drawing, or rendering, of an object that is reproducible in one color. The rendered drawing, or rendering, may be generated from a detailed image of an object (e.g. a color photograph). The rendered drawing, or rendering, may be photogrammetric and reproducible in one color (e.g. blueprint, monochrome laser print), yet still preserve a large amount of the detail with respect to the amount of detail in image (e.g., a photograph).

The metric nature and amount of image-detail preservation provided in such a rendering may significantly enhance the functionality of the rendering to users. Accordingly, such renderings may be utilized in very large-scale formats, such as wire frame style drawings used in the AEC industry for existing structures.

Presenting an object in greater detail in a drawing provides a user of the drawing with an enhanced interpretation of pre-existing conditions, with respect to said object, in "as-built" or "as is" environments. Such an increase in detail allow for an improved determination, by a user (or computer), of particular locations on the object when compared to traditional less-detailed wire frame style drawing. Such improved detail may find particular benefit with respect to the industry of repairing masonry facades as it is beneficial to show greater detail in order to enhance a mason's understanding of the structure of an object that needs repair or the structure of an object that was recently repaired.

Particular graphic arts techniques are realized along with photogrammetric techniques to preserve, fully or partially, information about an object that was captured in image such as a photograph. Such techniques allow for the information to be presented in a photogrammetrically correct rendering. Such a rendering may be utilized to fabricate a particular type of drawing—such as a drawing useful and/or familiar to mason or AEC user.

A photogrammetric rendering is provided that includes a digital image rectified photogrammetrically and rendered using particular graphic arts techniques. Such a photogrammetric rendering may be utilized to fabricate a particular type of drawing and may be combined with other types of information (e.g., additional images, legends, type or other indicia) to form the particular type of drawing (e.g. a blueprint).

In producing photogrammetric renderings by combining particular graphic art techniques and photogrammetry to produce rectified images or orthoimages incorporating "as-built" object detail many advantages may be realized. For example, nonmetric photographs and images may be utilized to prepare photogrammetric renderings, such as historical documents for objects that may no longer exist. As per another example, particular types of drawings, such as blueprints, may be economically produced. As yet another example, detailed digital renderings may be quickly rendered, stored, and printed. As yet another example, detail of existing objects not previously expressed in a rendering may now be expressed and incorporated into a rendering. Non-contact photographic means may also be utilized in fabricating detailed renderings. As per yet another example, the quantity of verification by field measurement needed may be reduced or eliminated. As per yet another example, economical production of end-use drawings containing photogrammetric renderings may be realized as compared to CAD/CAM preparation from photo or field measurements.

A detailed photogrammetric rendering may be produced to scale or out-of-scale. Additional information such as written notes may be added to the renderings.

Particular graphic arts techniques may be utilized with photogrammetry techniques to produce drawings incorporating photogrammetric renderings derived from the processing of non-metric images. Such drawings may be produced either as actual blueprints or in a format directly and/or closely analogous to blueprint paper drawings familiar in the AEC industry (e.g. laser print).

BRIEF DESCRIPTION OF THE DRAWINGS

The above and other objects and advantages of the present invention will be apparent upon consideration of the following detailed description, taken in conjunction with accompanying drawings, in which like reference characters refer to like parts.

DETAILED DESCRIPTION OF THE INVENTION

Figure 1:
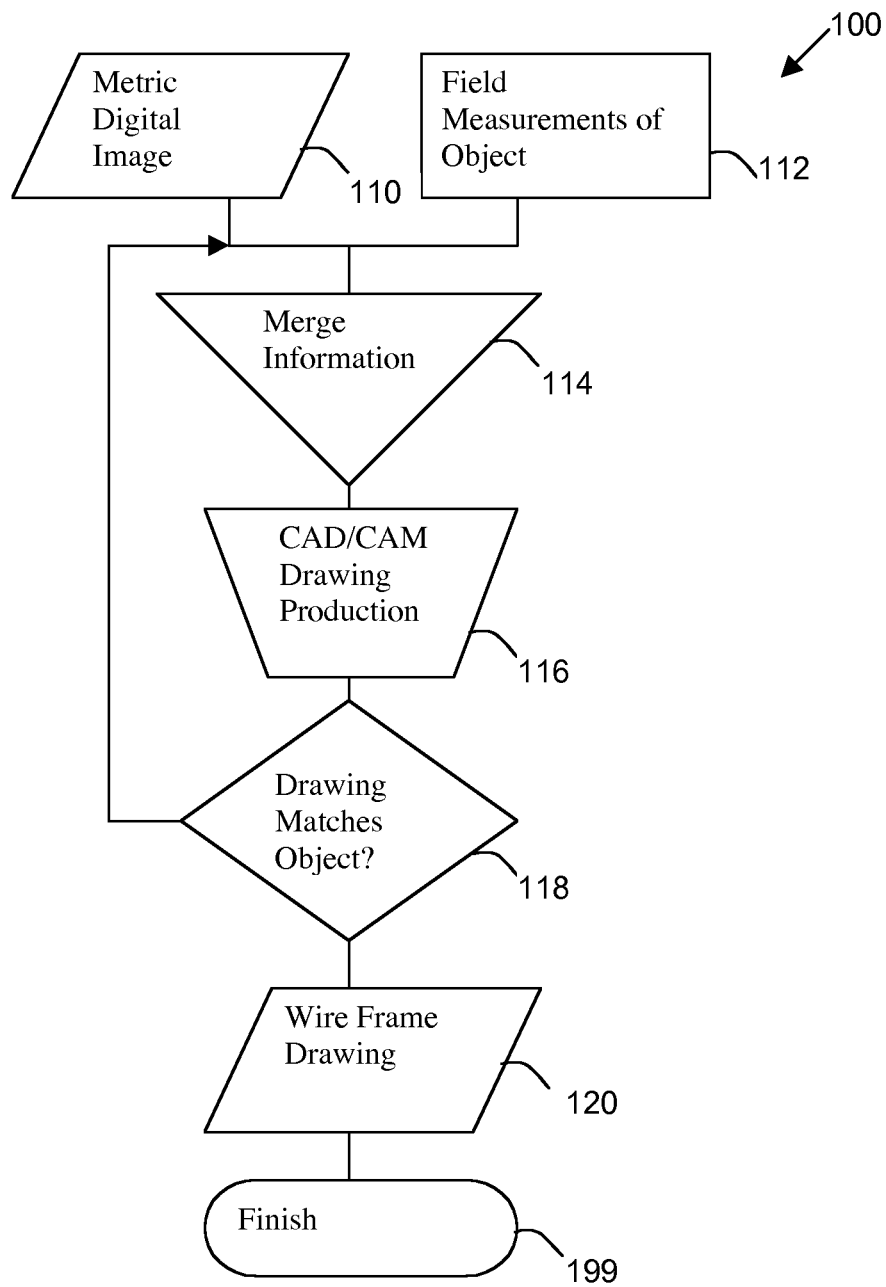
FIG. 1 shows a prior art flow chart for a manual method of producing a drawing resulting in a wire-frame model.

A photogrammetric rendering may be provided, for example, by processing a non-metric digital image (e.g. digital color photograph) to be fully or partially rectified according to a photogrammetric technique. Such processing may create an orthoimage that results in a digital photogrammetric image. Such a digital photogrammetric image may then be further processed by a graphic arts rendering process that results in a photogrammetric rendering.

All such processes may be performed by a computer autonomously. Once one sub-process completes, the next process may be automatically initiated and performed by the computer. Alternatively, for example, a process may be performed by a computer and the computer may request manual instructions at each processing step or at only particular processing steps. For example, a computer may request confirmation that a particularly processed image is satisfactory and that the next processing step should be initiated. The computer may allow a user to reject a particular image and enter in, or modify, parameters for the processing step that produced the image such that a more desirable image may be obtained. A user may instruct the computer to perform any processing step at any time. A user may setup processing packages that include multiple steps such that the user may initiate the package so the computer can autonomously perform all of the steps in the package. The user may add, remove, or modify steps from a package. Such packages may be initiated over the Internet such that a customer may upload an image/images for a desired object/objects, select a particular package, and then have the opportunity to download the results of those packages. Different packages may have different prices associated with the packages. Accordingly, a customer may upload an image that the user desires to have a blueprint for, start the process over internet (e.g., by pressing a START button) and then be presented with a blueprint that the customer can download over the internet. Accordingly, an autonomous process may be performed on a remote computer that can be fed an image/images over the Internet (or an intranet) and deliver processed images over the internet (or an intranet). A customer/user may be provided with the ability to add, remove, modify process steps to a package. Licenses may be sold that allow a user to use a package, multiple packages, or all packages for a period of time (e.g., a year) or for a set number of images (e.g., 5000 or less). Some licenses may, for example, allow a user/customer to add/modify/remove process steps from packages. The library of process steps available to a user/customer may, for example, change depending on the license.

Graphic arts rendering processes may include a variety of graphic arts processing techniques. Any number of graphic arts processing techniques (e.g., one, two, three, four, or more) may be performed in a graphic arts rendering process. For example, a graphic arts rendering technique may find contrast or texture transition zones (e.g., finding edges), reduce color images to grayscale, adjust the tonal balance (e.g. highlight, midtone and shadow balance adjustment), reduce continuous tones to a limited number of tones or levels (e.g. four-level grayscale), and equalize all tone levels to one level. Such techniques may similarly occur in any order or a particular order (e.g., the order described above).

A digital photogrammetric image resulting from a graphic art rendering process is a photogrammetric rendering. The photogrammetric rendering may be provided, for example, in one color, such as a line drawing or wire frame style drawing. For example, the photogrammetric rendering may be provided as a blueprint tailored to the AEC industry. Accordingly, a photogrammetric rendering may be, for example, one color and capable of reproduction as a blueprint.

Persons skilled in the art will appreciate that a multiplicity of graphic arts processes, in addition to or without the processes described above, may be performed in order to provide a final photogrammetric rendering suitable to a particular user. Persons skilled in the art will appreciate that the graphic arts processing techniques may be ordered in any way (e.g., as described above) and reordered for a particular image. Similarly, the order of the photogrammetric process and graphic arts processes may be performed in any order (e.g., graphics art processes before photogrammetric processes and vice versa). Particular processes may be performed in the middle of other processes. For example, graphic arts processes may be performed between photogrammetric processes (and vice versa). Additionally, particular graphic arts processes may be applied to the original, non-metric digital photograph prior to, and after, any photogrammetric correction.

Figure 2A:
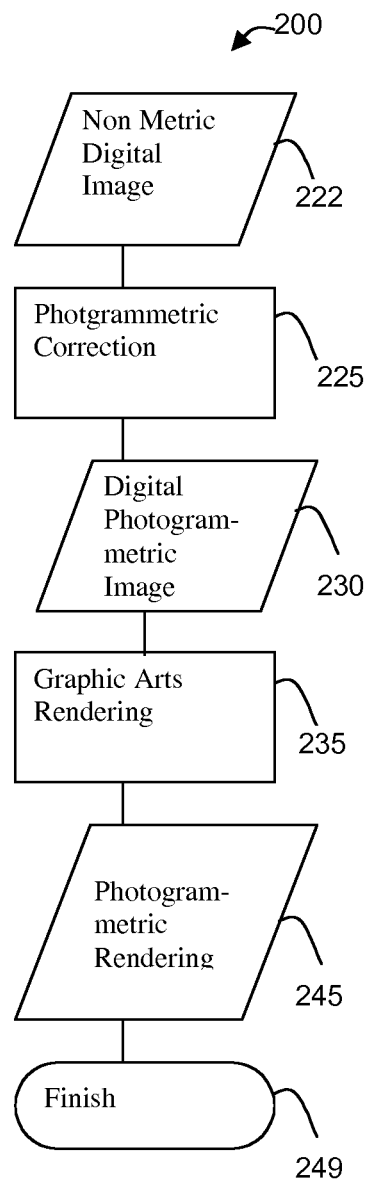
FIG. 2A shows a flow chart for producing a photogrammetric rendering preserving features and detail visible in a photograph.

FIG. 2A shows process 200 that may include non-metric digital image 222. Persons skilled in the art will appreciate that a metric digital image may be used in lieu of non-metric digital image 222. A metric image may be captured by, for example, metric photographic equipment. Similarly, stereo photos or stereo images may be utilized in process 200 (e.g., in lieu of non-metric digital image 222) as such photos and images may achieve better results in a photogrammetric correction process.

An initial image used to start process 200 may, for example, include any number of objects and any portion of any objects. Additionally, images may be removed (e.g., cut) from images such that images of particular objects may be separated and processed individually. Similarly, component parts of interest may be separated from an object of interest. All such objects and component parts may be reassembled after processing (e.g., after photogrammetric and graphic arts processing).

Additionally, an initial image may be digital or analog. For example, the starting image could be of a variety of types such as an original hand drawing, a photograph that has been printed or otherwise reproduced as a halftone image, an intermediate image such as photographic continuous tone negative, a photographic continuous tone separation, a halftone separation film, a printing plate, a painting, an original artwork, or any type of image.

Regardless of the form of the starting image, an image may be, for example, converted to a digital image the image may be stored as a file on a computer. Persons skilled in the art will appreciate that any raw unprocessed, preprocessed, beginning, intermediate or final image, rendering or file may be stored temporarily or permanently on a variety of media for further archival or further processing. Such images may be stored as a .JPG, .PICT, .TIFF, .BMP, or any other type of image file. Digital images may be, for example, be captured by way of a camera or scanner.

Non-metric digital image 222 may be processed through photogrammetric correction step 225 to provide digital photogrammetric image 230. Graphics art rendering step 235 may process digital photogrammetric image 230 to provide photogrammetric rendering 245. Process 200 may complete at, for example, step 249, albeit additional processing steps may occur anywhere in process 200 (e.g., after photogrammetric rendering 245 is obtained).

Figure 2B:
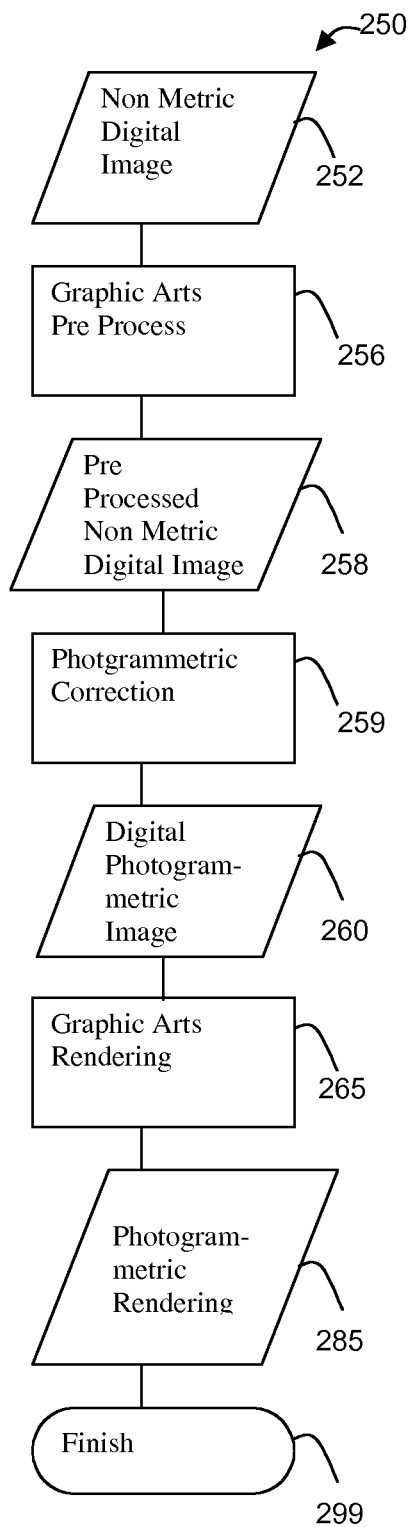
FIG. 2B shows a flow chart for producing a photogrammetric rendering from an image pre-processed by particular graphic arts techniques to preserve features and detail visible in a photograph.

FIG. 2B shows process 250. A non-metric digital image may also be, for example, pre-processed or post-processed with respect to a photogrammetric correction process (e.g., step 225) to remove objects other than the object, or objects, of interest. Objects not of interest may be removed or eliminated from a base images by one or more of a variety of techniques that may include, for example, erasure, masking, threshold cutoff, tonal balance adjustment, or any other graphic arts techniques.

Process 250 may include non-metric digital image 252 that may undergo pre-process graphic arts step 256 to provide pre-processed non-metric digital image 258. Photogrammetric correction may then occur in photogrammetric correction step 259 to provide digital photogrammetric image 260. Graphics art rendering may process photogrammetric image 260 to form photogrammetric rendering 285. Process 250 may complete at, for example, step 299, albeit additional processing steps may occur anywhere in process 250 (e.g., after photogrammetric rendering 285 is obtained).

Persons skilled in the art will appreciate that if reproduction of the photogrammetric rendering requires printing as single spot color of ink, monochromatic 1 bit color, processes 200 and 250 may be, for example, suitable. However, if grayscale reproduction would reproduce greater detail, for example, the graphic arts rendering process (e.g., step 235 or 265) may stop short of including indexing, equalization, or other processing to a two-level scale (e.g., in digital images, one bit color).

The image being processing may, for example, be metrically scaled to a known scale at any point after a digital photogrammetric image is achieved (e.g., digital photogrammetric images 240 and 260). Furthering this example, a scaled photogrammetric rendering may be processed into a document of a format suitable for end-use (e.g., a blueprint), which may contain additional information (e.g., a description of the object, its location, the date, compass orientation, a project name, drawing number, version number of the drawing). A final formatted document may then printed or otherwise preproduced for end-use. Final printing may be in the form of, for example, a blueprint if the image is 1 bit color depth. Grayscale photocopy or printing, for example, may be utilized if the image is greater than 1 bit color depth.

Those familiar with the graphic arts will also note that many additional processes to enhance contrast, feature definition, color balance, hue, color saturation and other aspects of the image may be accomplished prior or during the preferred embodiment.

Additionally, for example, the use of colors may be utilized. Colors may be referred to as, for example, color channels in digital image processing, RGB (Red, Green, and Blue) used in video displays of multi-color images, or CYMK (Cyan, Magenta, Yellow, and Black) in print production. Such schemes may be utilized in processing images to achieve colorized results. For example, color channels may be processed mathematically whether in positive, negative, or inverted form and whether singlely or in combination through additive, subtractive, multiplicative, or differential formula to improve and/or enhance final image results.

Images may be pre-processed in a variety of ways. For example, image ownership processing such as adding copyright information, security concerning image content, or segmenting processing may occur in order to retain intermediate images, increase productivity, impact economics, or affect security. Such pre-processing may include, for example, the production of orthoimages from single or stereo images, joining or "stitching" multiple images together into a single image, or converting images from color to black and white (and vise-versa).

Figure 3:
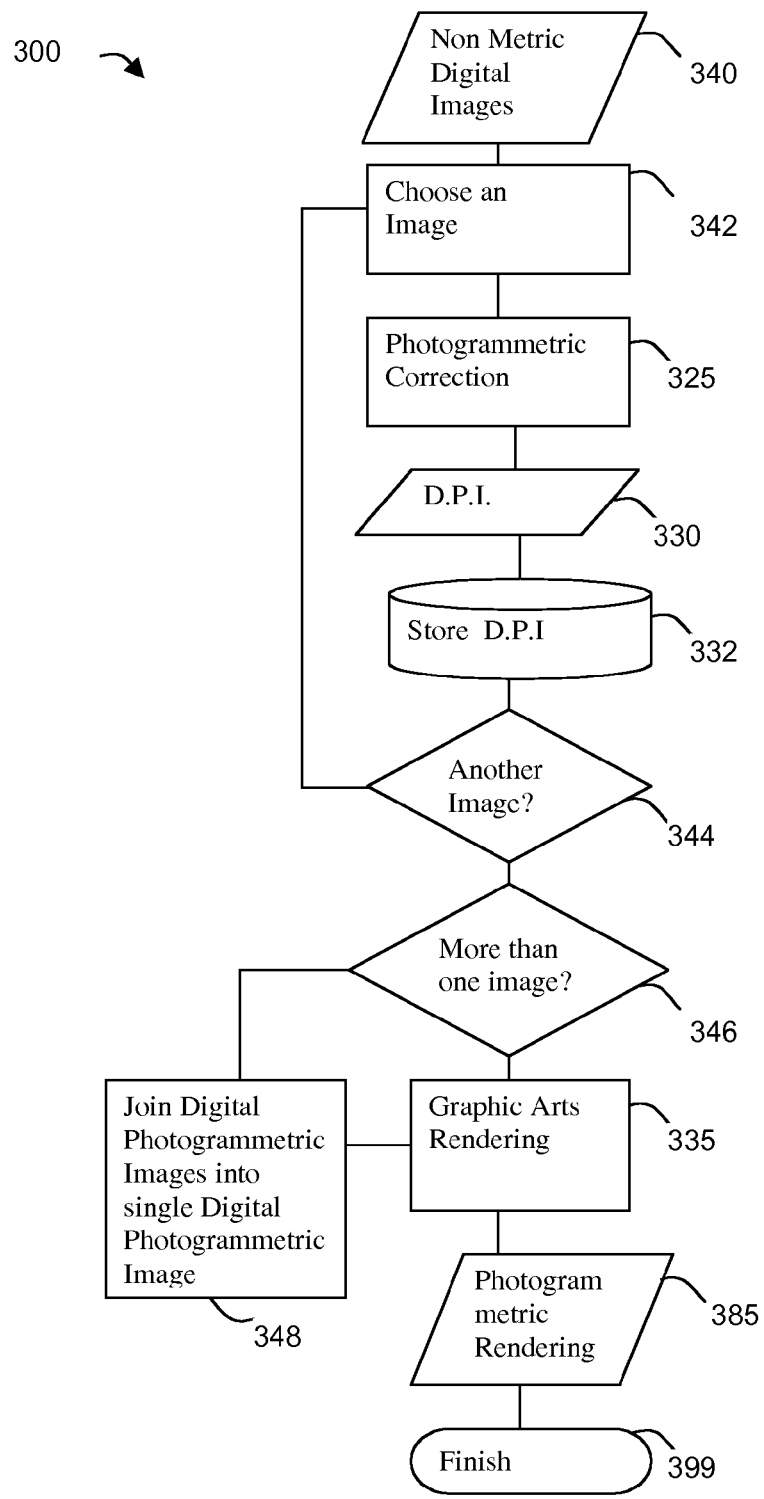
FIG. 3 shows a flow chart for producing a photogrammetric rendering preserving features and detail visible in multiple photographs with intermediate storage of rectified digital photogrammetric images prior to joining into a single digital photogrammetric image and prior to graphic arts rendering.

FIG. 3 shows process 300 that may use, for example, multiple starting images. Persons skilled in the art will appreciate that it is often beneficial to start a process of creating a photogrammetric rendering with multiple images due to the size of the object of interest, the field of view of the imaging device, any obstructions obscuring the view of the object, convenience, or in order to achieve proper photogrammetric correction of projections from an object (e.g. balconies, gables, etc.).

Each image may, for example, be processed individually in order to create separate digital photogrammetric image. Such digital photogrammetric images may be stored temporarily or permanently as they are processed. The multiple digital photogrammetric images may then be joined together ("stitched") to form a single image of the object of interest. The resulting single image may be photogrammetric in character and may be further processed by graphic arts rendering in order to yield the desired photogrammetric rendering.

Persons skilled in the art will appreciate that additional graphic arts techniques of cutting, pasting, overlapping, erasing, and others may be necessary to result in an image of the whole object of interest found in the multiple images.

In process 300, non-metric digital images may be obtained in step 340. An image may be chosen from the remaining to-be-processed images in step 342. For the chosen image, photogrammetric correction may occur in step 325 to form digital photogrammetric image 330, which may be stored in step 332. Step 344 may then determine if there is any image that is to-be-processed that has not yet been processed. If so, another image may be chosen and processed. Step 346 may determine if more than one digital photogrammetric image was obtained and, if so, the digital photogrammetric images may be joined into a single digital photogrammetric image in step 348. Graphics art rendering may occur in step 335 to provide photogrammetric rendering 385. Process 300 may complete, for example, in step 399.

Figure 4:
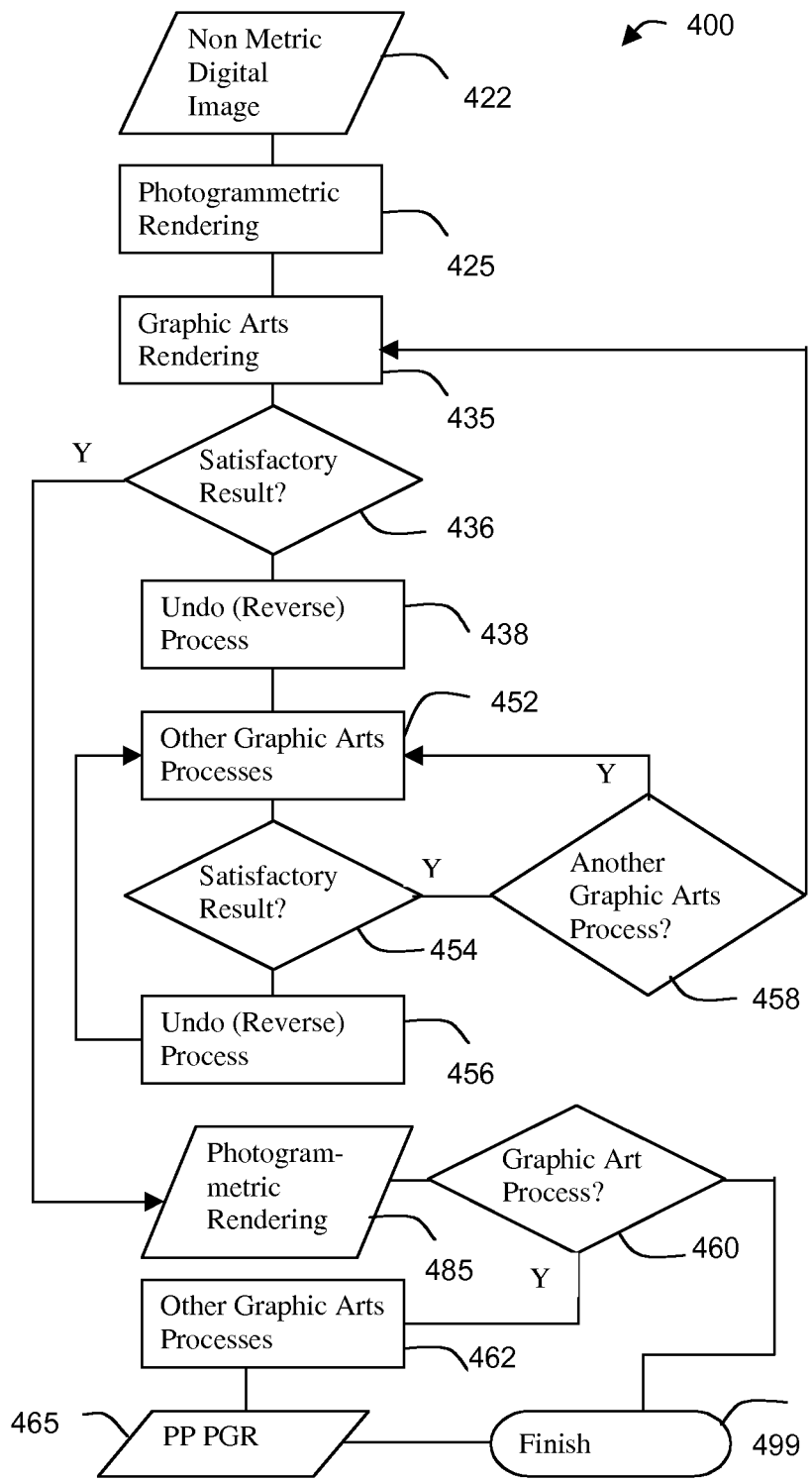
FIG. 4 shows a method for producing photogrammetric rendering from a photograph using multiple graphic arts processes to correct a photogrammetric image before rendering and possible further graphic arts processing.

FIG. 4 shows process 400 where iterative multiple graphic arts processes may be utilized after photogrammetric correction in order to achieve desired results in the post-processed photogrammetric rendering. Process 400 may, for example, include one or more graphic arts processes that may be utilized after graphic arts rendering, which may result in a post-processed photogrammetric rendering or "PP PGR" 465.

A post-process graphic arts process on a photogrammetric rendering may be, for example, the adjustment of tonal balance (e.g. highlight, midtone, shadow) in order to accentuate the edges of contrast change or to eliminate unwanted detail to allow a post-processed photogrammetric rendering to be reproduced as blueprint in one bit color.

Process 400 may include non-metric digital image 422 that may be processed by photogrammetric rendering 425 and graphic arts rendering 435, the result of which may be valued at step 436 in order to determine if the result is satisfactory. If satisfactory, photogrammetric rendering 485 may continue to determination stage 460 to determine if additional processes 462 should occur to produce PP PGR 465. Process 400 may end at, for example, step 499. If a satisfactory result is not obtained, one or more of the processes (e.g., all the processes) may be undone (reversed) in step 438. For example, the graphics art rendering may be undone. Alternatively, saved versions of the file after different processing steps may be retrieved and utilized (and the image desiring reversal may be deleted or ignored). Other graphics art processes may occur in step 453 and another determination as to whether the result is satisfactory may occur at step 454. If the result is satisfactory photogrammetric rendering 485 may continue to step 460. If unsatisfactory, the process can be redone at step 456 (or the a previously processed image may be retrieved). Additional graphics art process determinations (e.g., step 458) and related steps may occur at any time.

Figure 5:
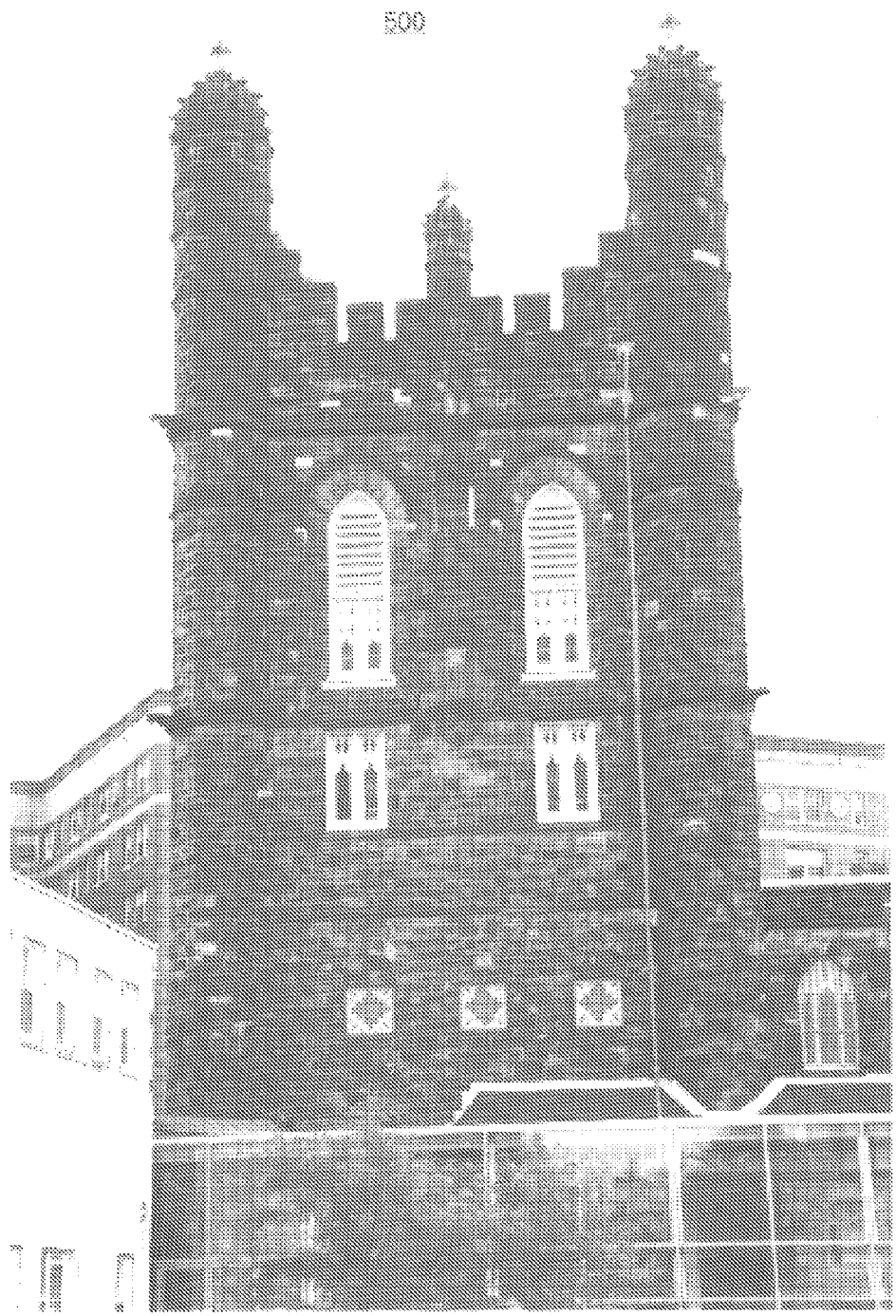
FIG. 5 shows an raw image from a non-metric camera of a building and background to be processed.

FIG. 5 shows a non-metric digital image that would be typical of a raw unprocessed image that might be available to be used as an image to start process 250 of FIG. 2B. Process 250 may, for example, start a photo, image, or set of stereo photos, or stereo images of the object or objects on interest to be shown in the final image or document. Image 500 of FIG. 5 may, for example, be processed by removing or eliminating extraneous objects such as backgrounds, foregrounds, objects other than to one or ones of interest from a non metric digital image by one or more of several techniques such as erasure, masking, or other techniques.

Figure 6:
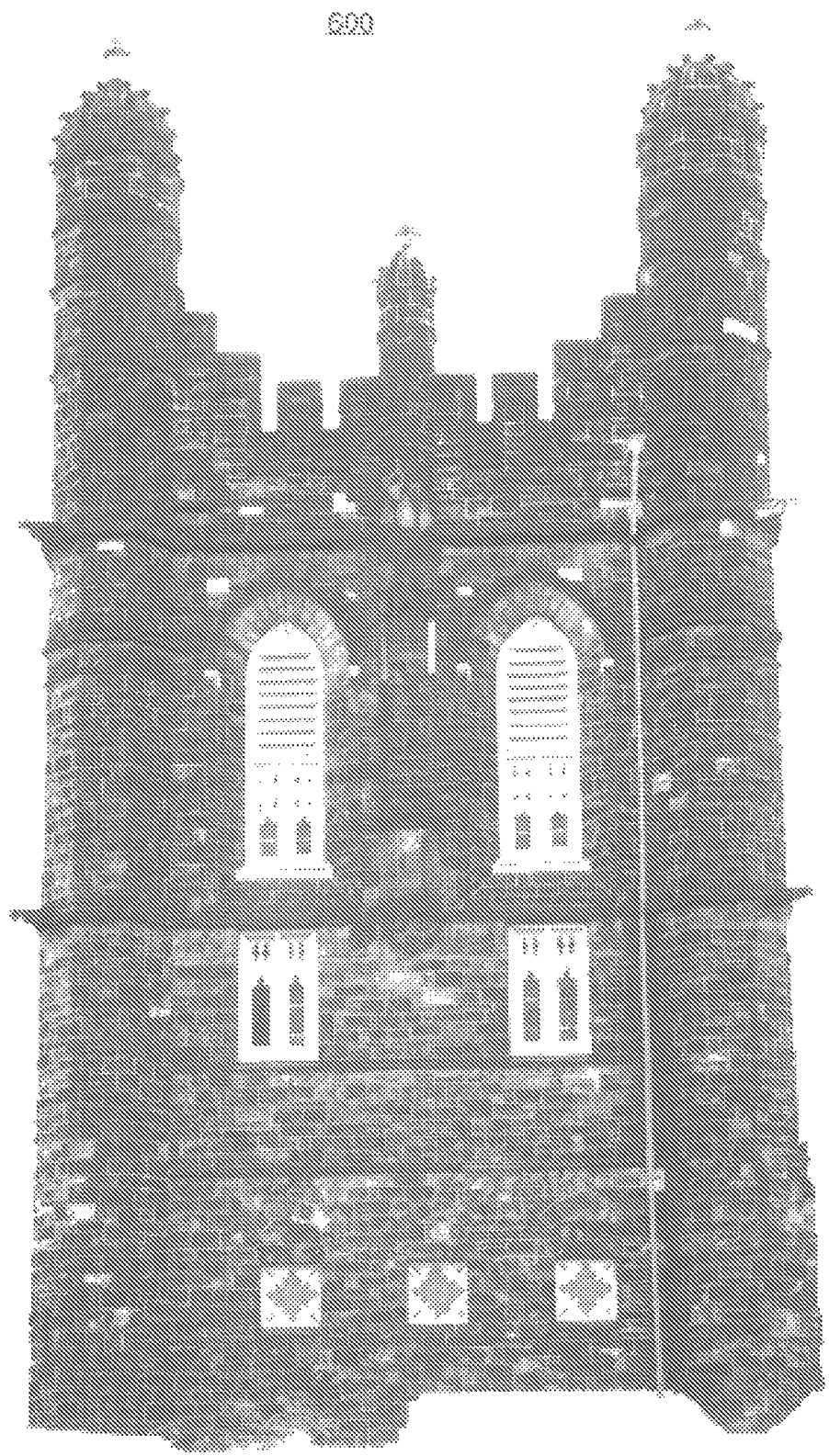
FIG. 6 shows a processed image in which extraneous objects and background have been removed through graphic arts processing (e.g., physical masking and negative duplication of unmasked area or in electronic photo editing highlighting and then deleting areas of different contrast).

The result of a graphic arts pre-process of removing objects not of interest of image 500 may be image 600 of FIG. 6. Persons skilled in the art will appreciate that image 600 has not undergone photogrammetric correction processing. In this case, for example, the graphic arts process of removing objects not of interest was accomplished in a preprocessing step prior to photogrammetric correction.

A pre-processed non-metric digital image is then processed to produce a photogrammetricly corrected, rectified or orthogonally correct image, an "orthophoto" or "orthoimage". Image 700 of FIG. 7 shows a digital photogrammetric image resulting from the photogrammetric correction process on a preprocessed image, in which backgrounds and other objects not of interest have been removed to form the preprocessed image.

Figure 7:
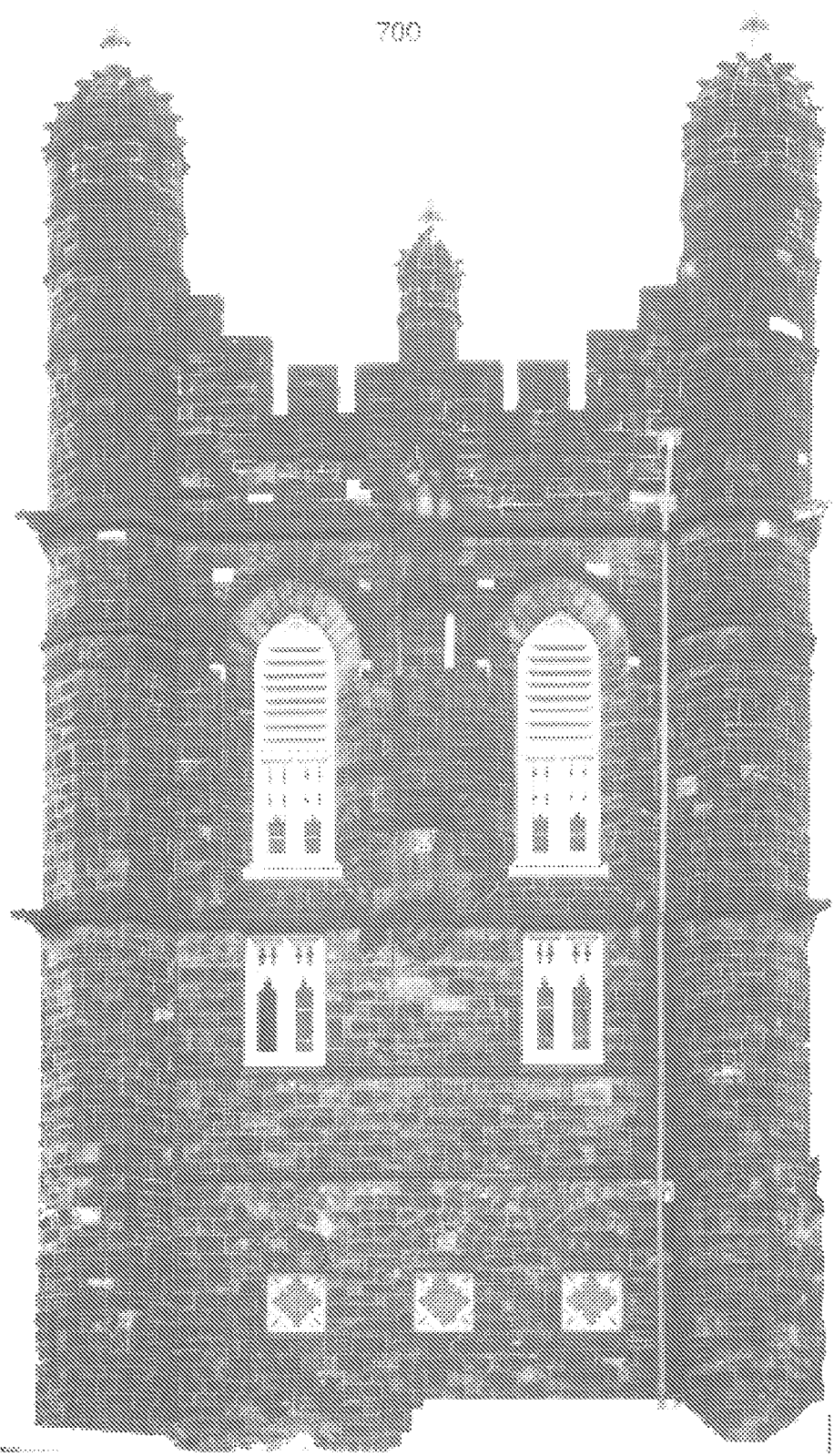
FIG. 7 shows a rectified image correcting for camera lens distortion and image distortions due to perspective, skew, etc (e.g., using graphic arts cameras where the original image plane can be rotated from parallel to the image receptor plane to take a photo that removes perspective or in digital photo editing stretching the photo along vertical or horizontal axes at one edge).
Figure 8A:
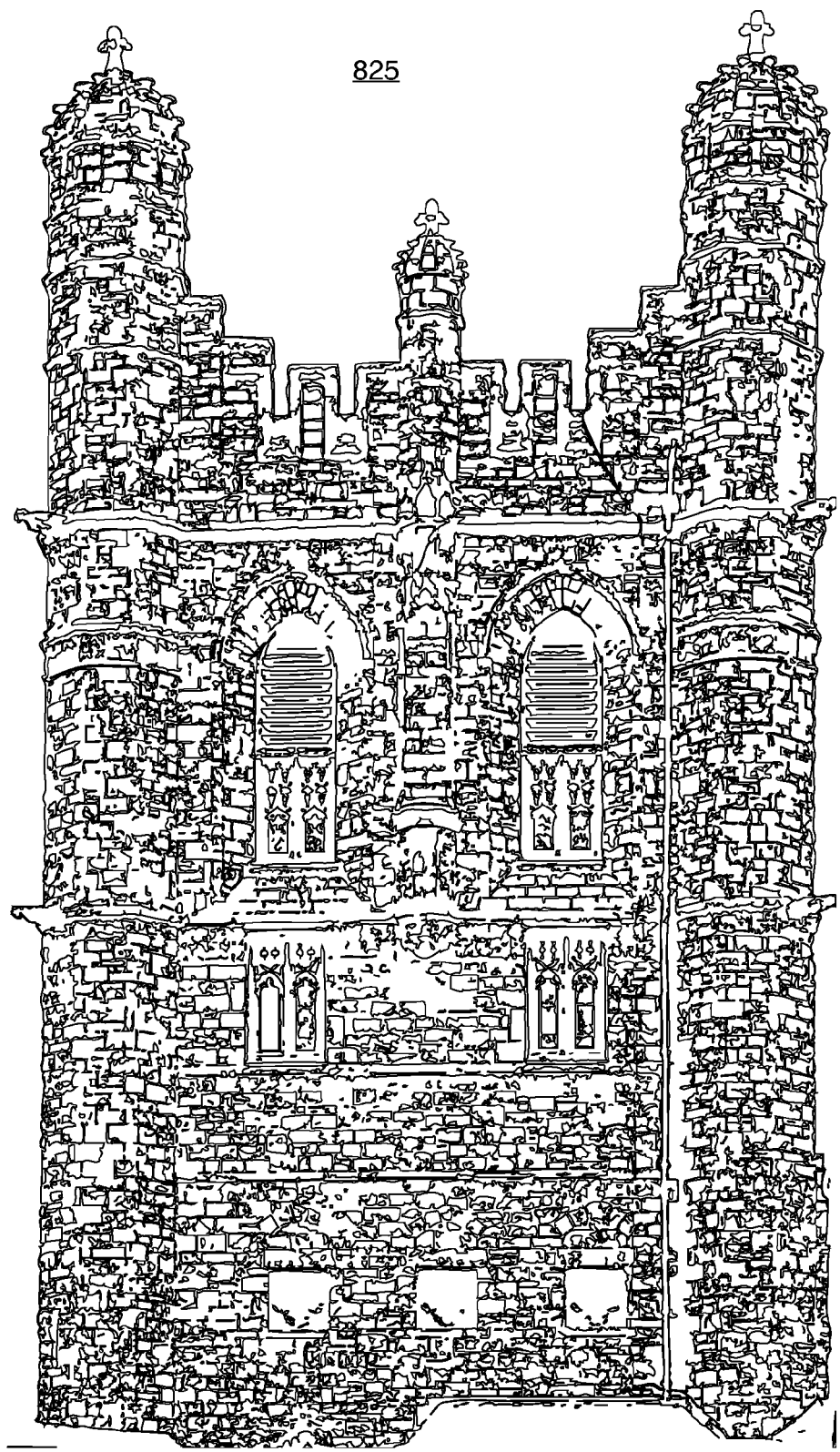
FIG. 8A shows a rendering that has been processed according to the preserving feature detail from photographs and produced in such a way that the line art image could be used as a substitute for blueprints (e.g., in digital photo editing finding edges of contrast change and eliminating other image content).
Figure 8B:
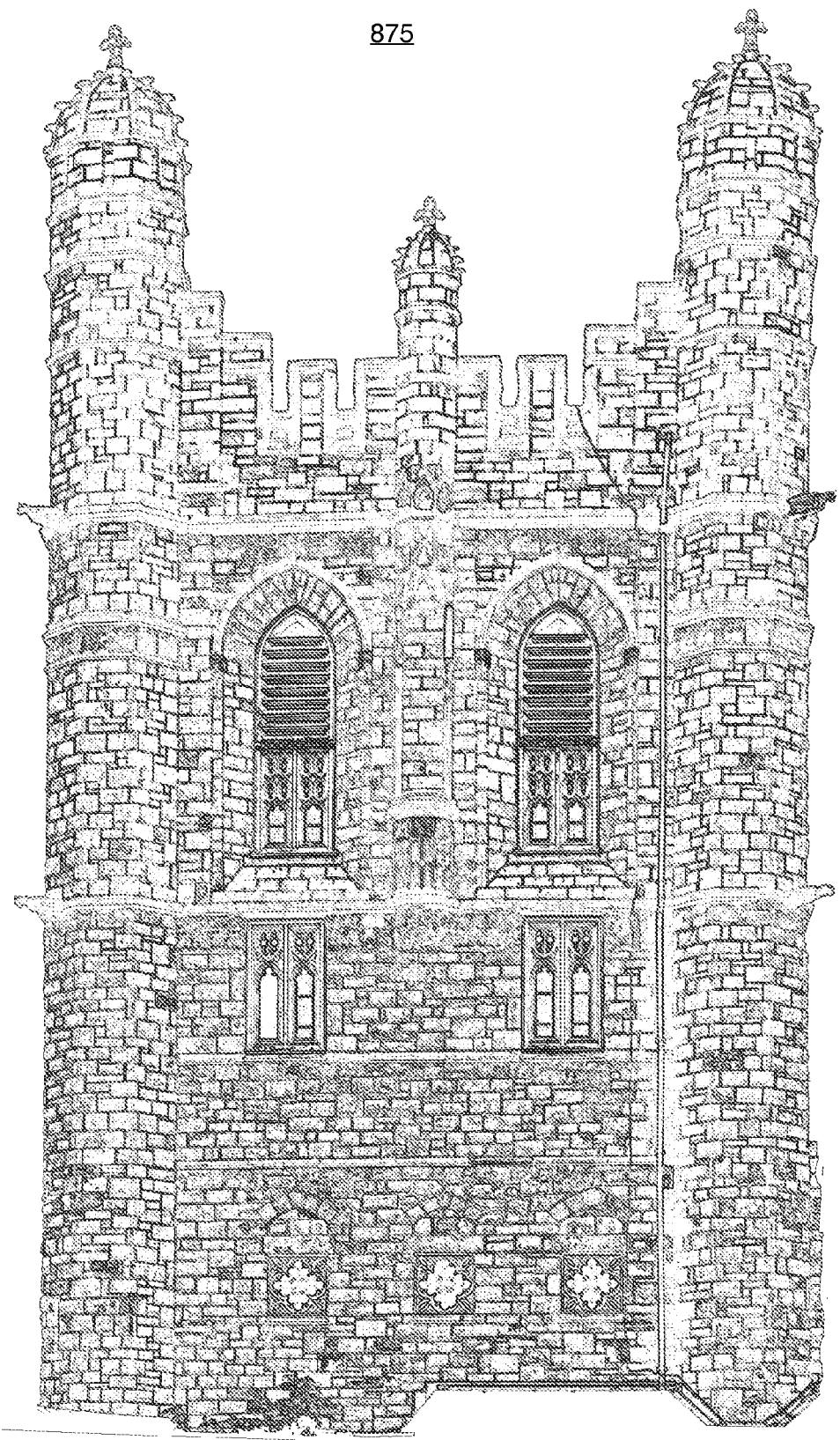
FIG. 8B shows an image that has been processed according to invention preserving feature detail from photographs and produced in such a way that the grayscale image could be used as a substitute for blueprints (e.g., eliminating color information through the uses of color filters or in digital photo editing converting to grayscale).

FIG. 8A shows the results of the graphic arts rendering process (image 825) on image 700 of FIG. 7. FIG. 8B shows image 875, which is similar to image 825 of FIG. 8A only to the step of continuous tone grayscale.

Figure 9A:
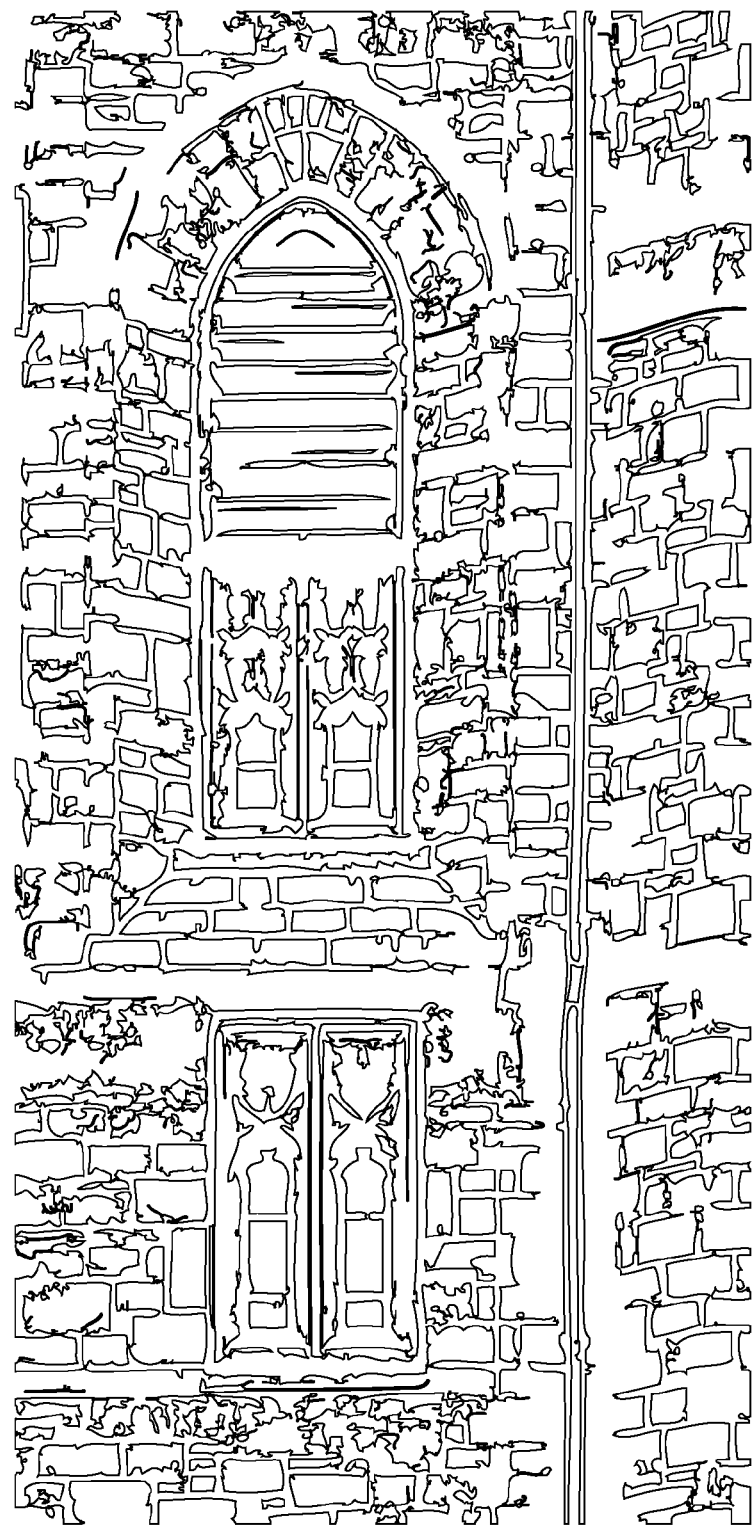
FIG. 9A shows a close up view of the rendering in FIG. 8A showing more clearly the detail in existing objects.
Figure 9B:
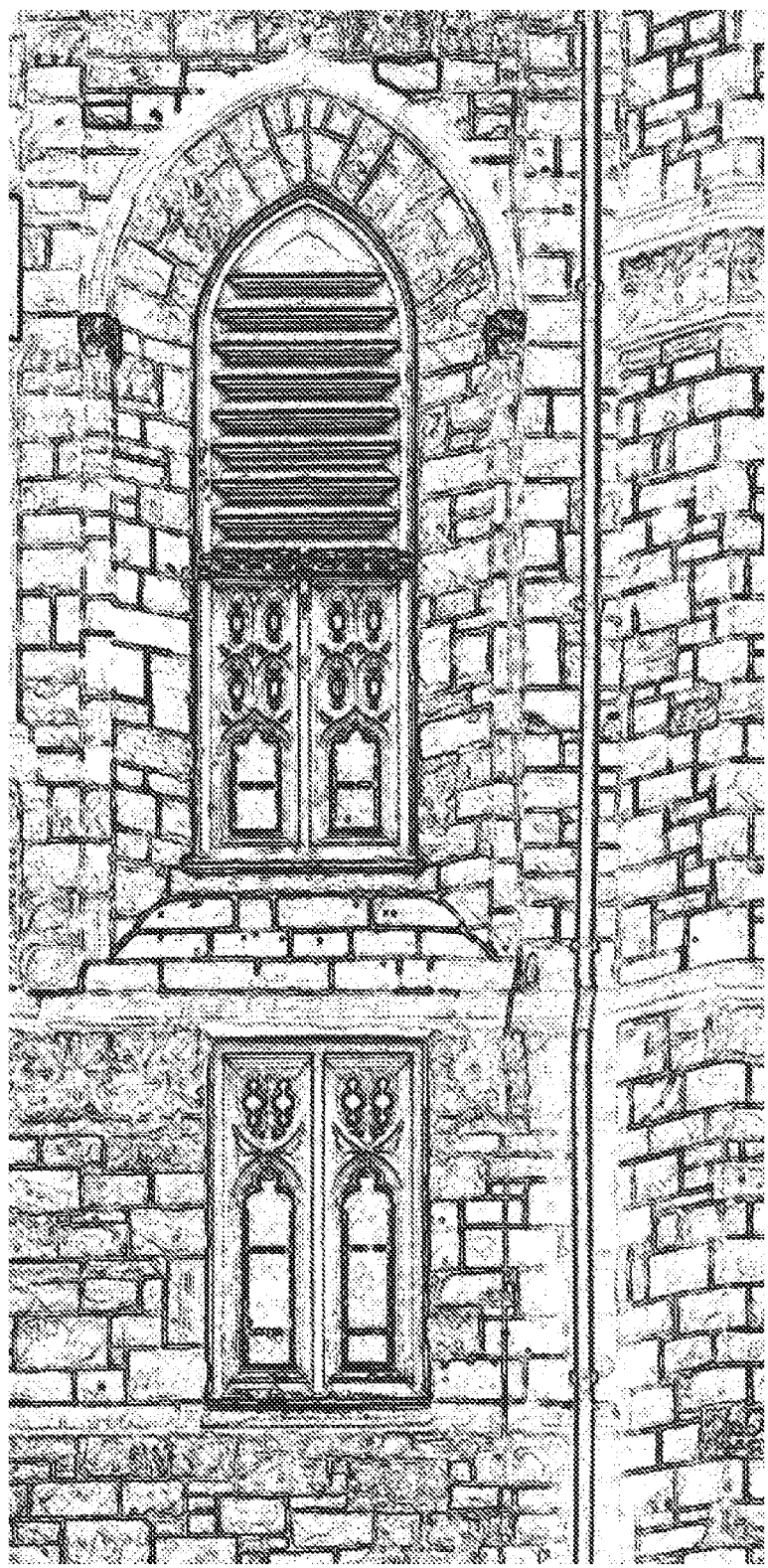
FIG. 9B shows a close up view of the image in FIG. 8B showing more clearly the detail in existing objects.

Image 910 of FIG. 9A shows detail of image 825 of FIG. 8A also as a rendering and image 920 of FIG. 9B shows detail of image 875 of FIG. 8B in grayscale. The images of FIGS. 8A, 8B, 9A and 9B show the retained detail found in the original non-metric digital images as shown in FIG. 5, 6, or 7. In the case of the AEC industry, this retained information would be quite useful and valuable to planning work such a masonry restoration of the building pictured in the FIGS. 8A, 8B, 9A, and 9B.

FIGS. 9C through 9H show that it may be useful to render an image in more than one tonal range to extract the maximum useful information from the original non metric digital image.

Figure 9C:
FIG. 9C shows a close up view of a portion of the image in FIG. 7 rendered to enhance deep shadow contrast features (e.g., produced with flash under exposure on photo duplication).

Image 930 of FIG. 9C, for example, shows rendering at a threshold cut-off level for levels for deep shadow.

Figure 9D:
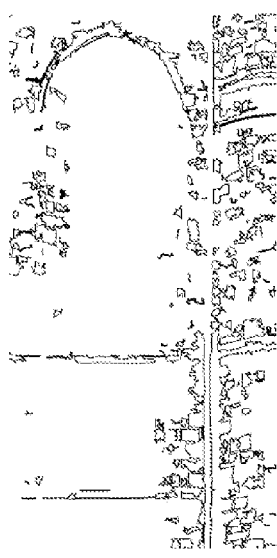
FIG. 9D shows a close up view of a portion of the image in FIG. 10 rendered to enhance shadow contrast features.

Image 940 of FIG. 9D, for example, shows rendering at a threshold cut-off level for levels for shadow.

Figure 9E:
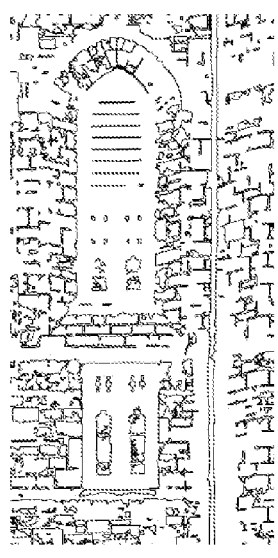
FIG. 9E shows a close up view of a portion of the image in FIG. 7 rendered to enhance shadow low midtone features.

Image 950 of FIG. 9E, for example, shows rendering at a threshold cut-off level for levels for low midtone.

Figure 9F:
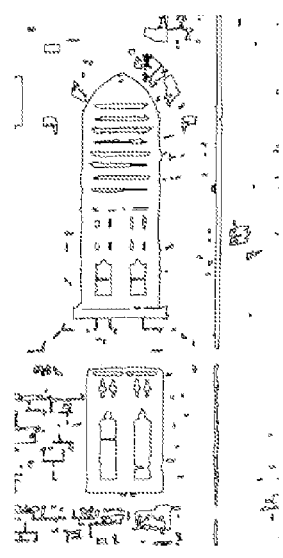
FIG. 9F shows a close up view of a portion of the image in FIG. 7 rendered to enhance shadow high midtone features.

Image 960 of FIG. 9F, for example, shows rendering at a threshold cut-off level for levels for high midtone.

Figure 9G:
FIG. 9G shows a close up view of a portion of the image in FIG. 7 rendered to enhance shadow highlight features (e.g., produced with flash over exposure).

Image 970 of FIG. 9G, for example, shows rendering at a threshold cut-off level for levels for highlight.

Thus, FIGS. 9C through 9G show rendering at threshold cut-off levels for deep shadow, shadow, low midtone, high midtone, and highlight respectively for 9C, 9D, 9E, 9F, and 9G.

Figure 9H:
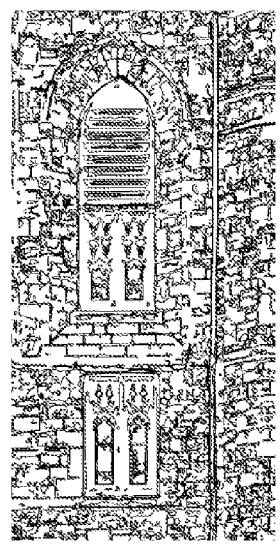
FIG. 9H shows the combination of FIGS. 9C through 9G.
Figure 15:
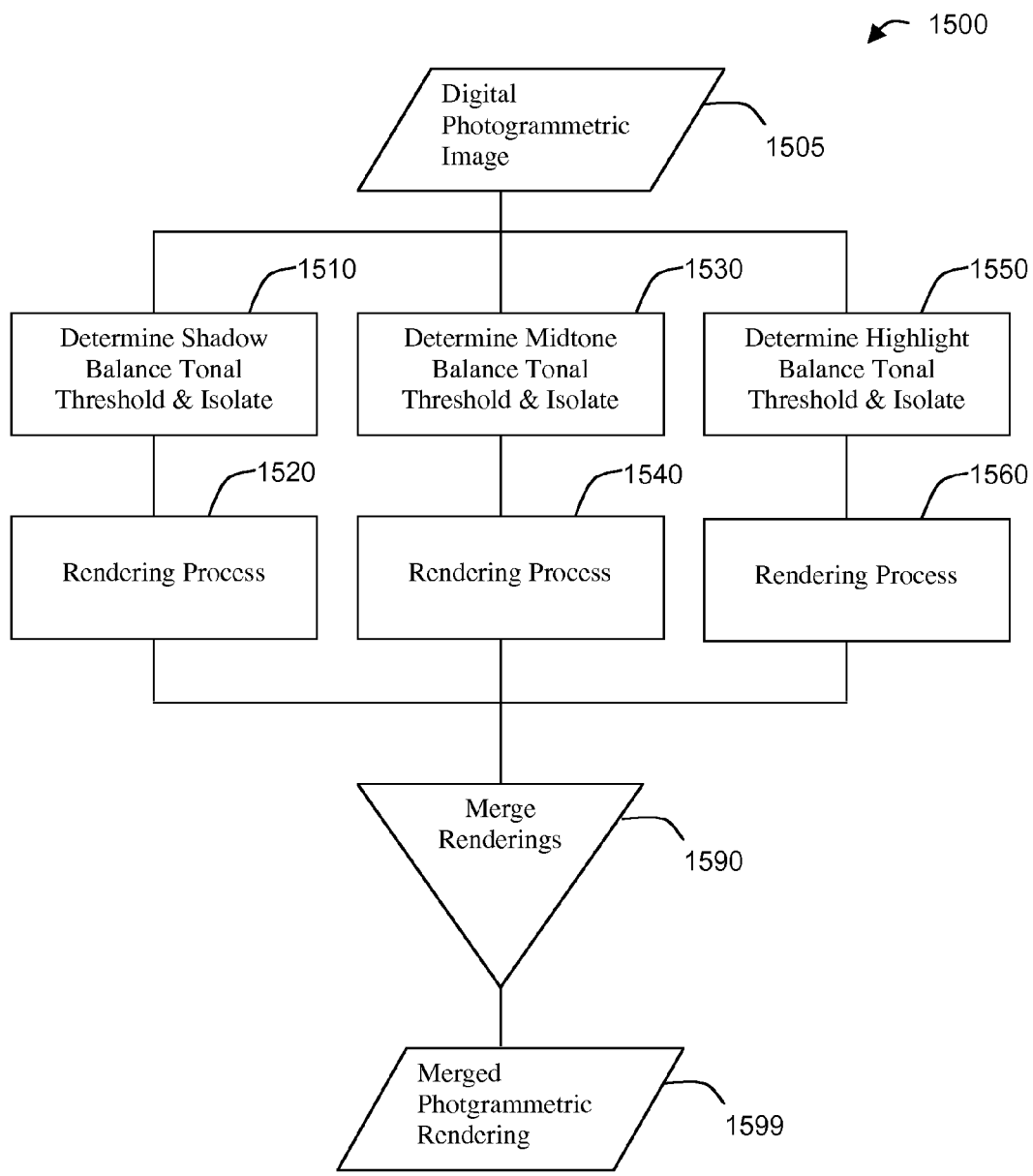
FIG. 15 shows a flow chart for producing a photogrammetric rendering preserving features and detail visible in multiple tonal areas of the original image by processing tonal ranges such as shadow, midtone, and highlight independently for graphics art processes with intermediate storage of graphic arts processed images for a multiplicity of tonal ranges prior to joining intermediate images into a single digital photogrammetric image.

FIG. 9H shows the combination of FIGS. 9C through 9G into a single rendering. A process for creating the individual rendering for the various tonal ranges may be provided by, for example, process 1500 of FIG. 15.

Process 1500 includes a non-metric image or digital image may be pre-processed to create digital photogrammetric image 1505. The tonal balance of the image in shadow, midtone, and highlight ranges may, for example, be determined and isolated in steps 1510, 1520, 1530, 1540, 1550, and 1560, respectively. Persons skilled in the art will appreciate that any number of threshold determinations and trace rendering processes may occur. For example, five thresholds may be determined corresponding to, for example, deep shadow, shadow, midtone, high midtone, and highlight. Persons skilled in the art will appreciate that trace rendering processes based on tonal thresholds may, for example, isolate separate sub-images (e.g., channels/layers of interest).

A graphic arts process, in this case, a rendering is performed separately on all or some of the tonal ranges. Such a rendering may occur, for example, by finding particular edges (e.g., as occurs in steps 1520, 1540, and 1560). Thresholds may be set for such processes and may merely be turned ON or OFF by the user. Alternatively, for example, a user may set any threshold. Each of the steps 1510, 1530, and 1550 as well as 1520, 1540, and 1560 may vary for each tonal range to extract the most beneficial result for the users.

After the trace rending process, the resulting rendered trace images are then merged back into a single image 1590. In digital image photo editing this process may be accomplished using layers. A result of such a process may be, for example, merged Photogrammetric Rendering 1599.

The results of a process similar to process 1500 can be seen in images 9C through 9H as follows. Here, five tonal ranges have been used and separated into separate images. In each case, the rendering process used is finding edges or highlighting the areas of contrast change or shift. The result of the process of merging the separate tonal ranges can be seen in image 980 of FIG. 9H.

Persons skilled in the art will appreciate that any number of channels, or layers, to tonal ranges may be separated for individual processing using the same or differing techniques on individual layers. Additionally, all or only some of the individual layers may be merged into a final merged photogrammetric rendering.

Persons skilled in the art will appreciate that end documents or images may be produced in more that one color of ink for the purpose for further enhancing the benefits of or use of the end documents to end users (e.g., highlighting areas of interest or special need or attention). In one example, with respect to FIGS. 9C through 9G, it may be beneficial to produce the combined image in various colors using the various images for each color in order to accentuate certain features (e.g. mortar joints) in combined image. In another example, rectified images of objects that exist in more than one plane may be produced by displaying the objects in different planes, such as those not perpendicular to the orthogonal view presented, in different colors.

In the case of the AEC industry, projections from the orthogonal plane of a building that are sloped, slanted, curved or otherwise not orthogonally viewed from the same position may be represented in alternate colors to indicate that in the view presented they are not presented orthogonally, cannot be measured photgrammetrically, or the area as shown is different from the true area as viewed or field measured. Display or printing in multiple line art colors is possible, for example, by either copying the image to a different color channel or by changing the color channel prior to display or by using graphic arts films or printing plates with different ink colors than the original.

Figure 10:
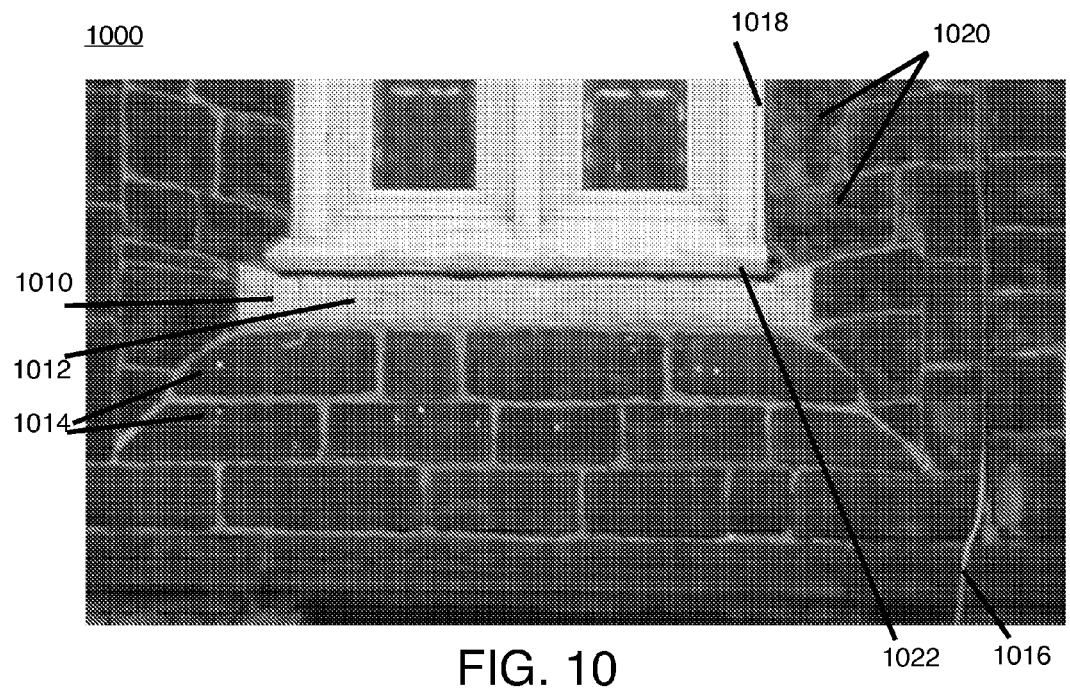
FIG. 10 shows a close up of a portion of the image in FIG. 7.
Figure 11:
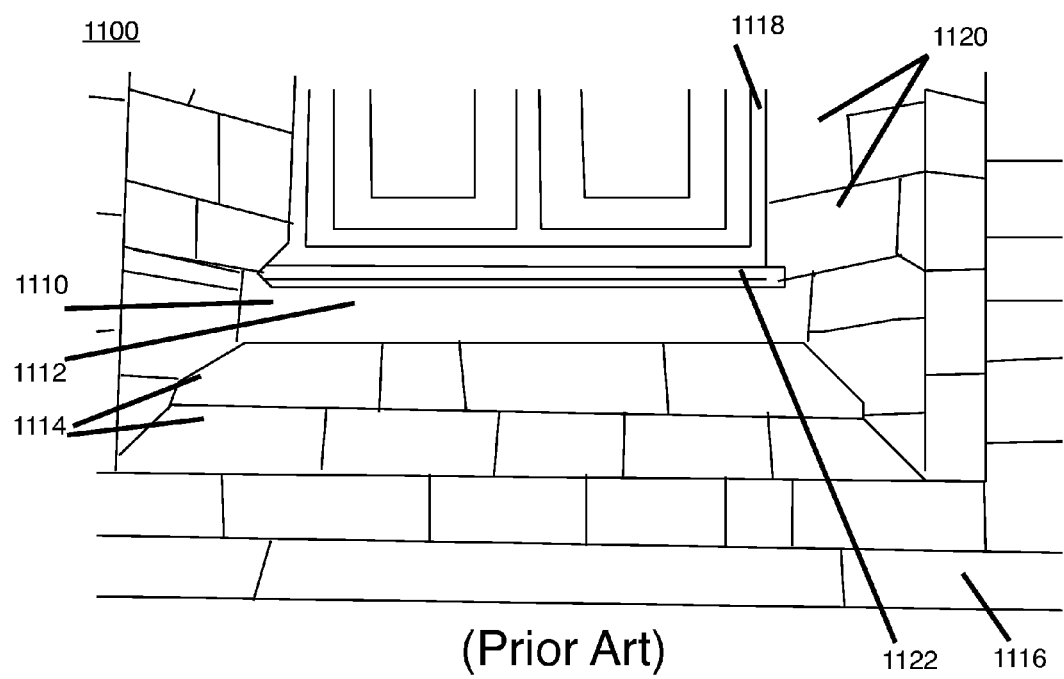
FIG. 11 shows a prior art wire frame drawing of the object in FIG. 10. The wire frame drawing is typical of CAD/CAM in the level of detail information provided about the object to a viewer of the drawing.

The advantages of the invention are clearly understood by viewing the differences between FIG. 10, prior art FIG. 11, and FIG. 12, while FIG. 13 shows processing to retain more or less detail in the image of an object when preparing a photogrammetric rendering.

FIG. 10 shows detail of the digital photogrammetric images found in FIG. 7, shown here in continuous tone grayscale. Window Lintel 1010 shows stone textures 1012 clearly.

Also paint drops 1014 are clearly shown. The window trim made of wood serving as rain drip edge 1202 also shows color reproduction is also possible particularly in the case of low color saturation so that printed documents may be marked and written in the field by users. Persons skilled in the arts will appreciate that a one-color drawing, or a drawing of any number of colors, may be printed in multiple colors or "full color process" as it is known in the graphic arts industry. For example, particular line segments of a one-color line drawing may be given different colors such that a full-color document may be displayed or printed.

Persons skilled in the art will appreciate that color reproduction, particularly in the case of low color saturation, is also possible so that printed documents will appear "washed out," and may be more clearly and noticeably marked and written on in the field by users.

FIGS. 12A through 12J show the advantages of several embodiments and alternate graphic arts process performed on FIG. 10.

Figure 12A:
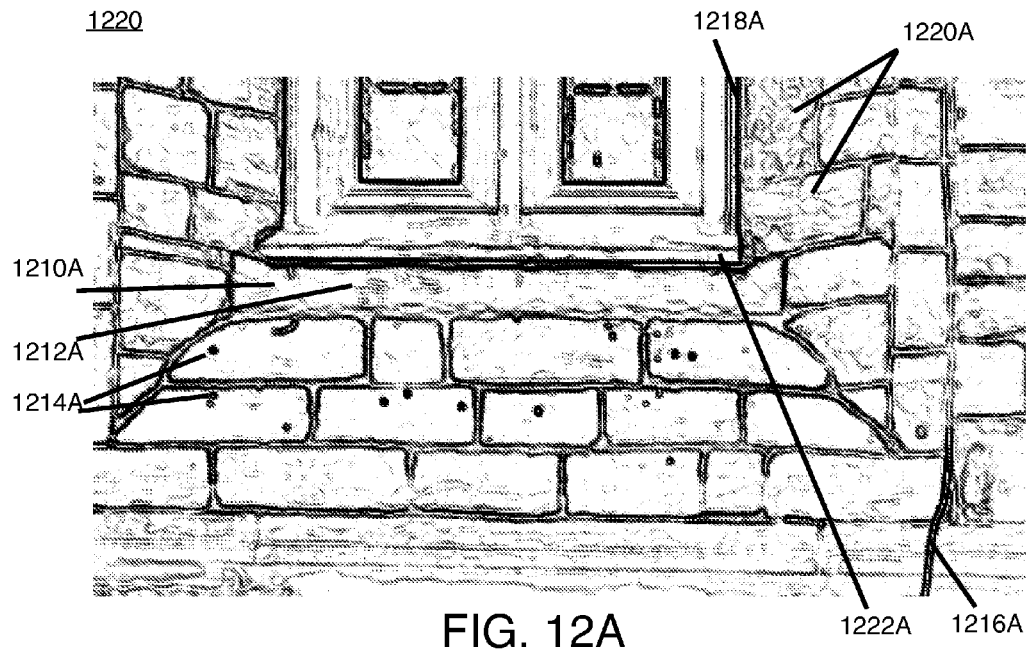
FIG. 12A shows a grayscale rendering of FIG. 10 after processing to eliminate color information and convert to continuous tone grayscale and then reduce the number of levels of gray used.

FIG. 12A shows image 1220, which is a grayscale rendering of FIG. 10 in 8 levels of gray. The stone texture 1212A and paint drops 1214A are clearly seen. It is also easily determined that 1218A is wood framing around the window. Lighting rod cable 1216A is clearly seen as something other than a mortar joint and most probably a wire or cable. As a grayscale rendering, FIG. 12A may be reproduced by photocopy, laser printer, printing or other means capable of reproducing continuous tone or near continuous tone images with success.

A process for creating image 1220 of FIG. 12A can be traced in process 250 of FIG. 2B. Here, image 500 of FIG. 5 may corresponds to non-metric digital image 252. Graphic arts process 256 may be to digitally mask the extraneous content so that result is image 600 of FIG. 6. The result is a pre-processed non-metric digital image 258 that is ready for further graphic arts processing, not shown in 250, or photogrammetric processing. Image 258 is then corrected for perspective and skew 259 resulting in a digital photogrammetric image 260 shown as image 700 shown in FIG. 7. Perspective correction can either be accomplished manually using cameras with nonparallel image display and image receptor film planes or using digital photo editing processes of perspective correction.

Figure 14A:
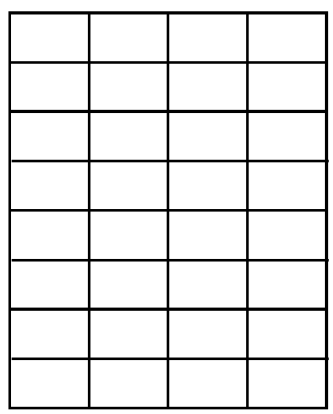
FIG. 14A shows a rectilinear projection of a gird which is analogous, for example, to an object in a photograph when taken with a metric camera or other image produced by other means, or when effects show in FIGS. 14B through 14G have been corrected. Such a figure may be utilized as, for example, an elevation drawing by an architect.
Figure 14B:
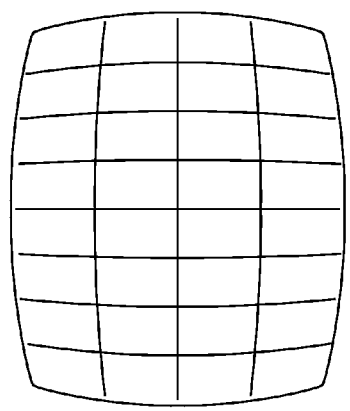
FIG. 14B shows sample distortion due to light refraction distortion due to the camera lens in photography of a type know as barrel lens distortion.
Figure 14C:
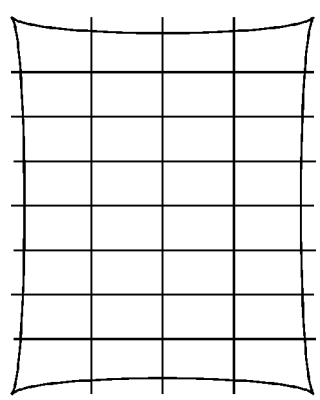
FIG. 14C shows an effect essentially opposite of FIG. 14B due the same reasons, but called pin cushion effect.
Figure 14D:
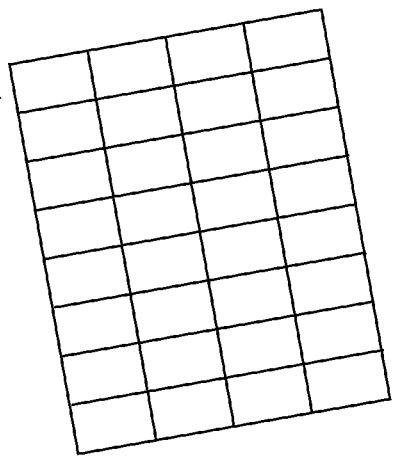
FIG. 14D shows rotation of an image on a film or digital image due to the camera and object not being horizontally aligned on the same visual horizon.

An example of perspective and skew which are demonstrated in 1460 of 14F and 1450 of 14E, respectively with the correction resulting as 1410 of FIG. 14A can be seen in image 600 of FIG. 6 prior to correction and image 700 of FIG. 7 after correction. Less noticeable is in image 500 of FIG. 5 is horizon misalignment demonstrated in 1440 of FIG. 14D which may also be corrected to 1410 of FIG. 14A as shown in 600 of FIG. 6. In this case, image 500 of FIG. 5 is more analogous to 1470 of FIG. 14G undergoing multiple serial graphic arts processes to result in image 700 of FIG. 7.

Person skilled in the art will appreciate that the multiplicity of effects shown in FIGS. 14B through 14G, take either individually or as a whole, as may be corrected for serially or in any order such that corrected image 1410 of FIG. 14A is achieved. For example, 1470 of FIG. 14G may be corrected. It may be desirable, depending upon manual or computer-aided processes, to proceed in a particular order, and correct defects in a particular sequence depending upon both the original image and the desired end-use image.

Not shown in process 250 is a graphic arts process of extracting, clipping, or cutting a portion of image 700, and then scaling and cropping the extraction so that the resulting image portion corresponds to 1000 in FIG. 10. Image 1000 which, is still a continuous tone image is then reduced by process 265, in this case multiple processes, namely discarding color information, finding edges of contrast change, and then reducing the image to eight levels of grey, the results being photogrammetric rendering 285 shown as image 1220 in FIG. 12A.

Figure 12B:
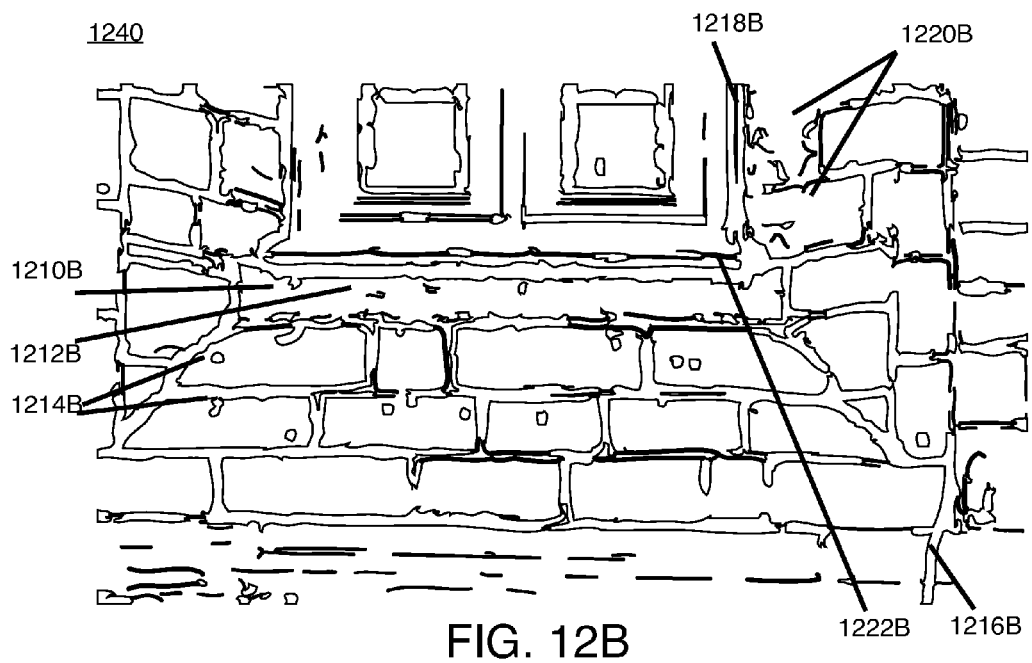
FIG. 12B shows a rendering in a technical drawing style similar in form to wire frame drawings produced by CAD/CAM, but preserving a greater level of detail than shown in FIG. 11, yet still be reproduced as line art (e.g., a blueprint).

FIG. 12B shows a technical drawing style rendering of FIG. 10. Note that while having far less visible detail retained as compared to FIG. 12A, FIG. 12B still shows some of the stone texture 1212B and the paint drops 1214B (which were visible in the original digital image FIG. 10). Also it certain with a fair level of confidence that 1218 is the wood framing of the window. Image 1240B in FIG. 12B is created by additional graphic arts processing done to image 1220 in FIG. 12A, namely discarding highlight information and using the edge lines of contrast differential as guides to draw the lines of the technical drawing. Those familiar with the art will understand the drawing depicted in image 1240 could be created by hand drawing, but is more efficiently accomplished using digital photo editing techniques.

Figure 12C:
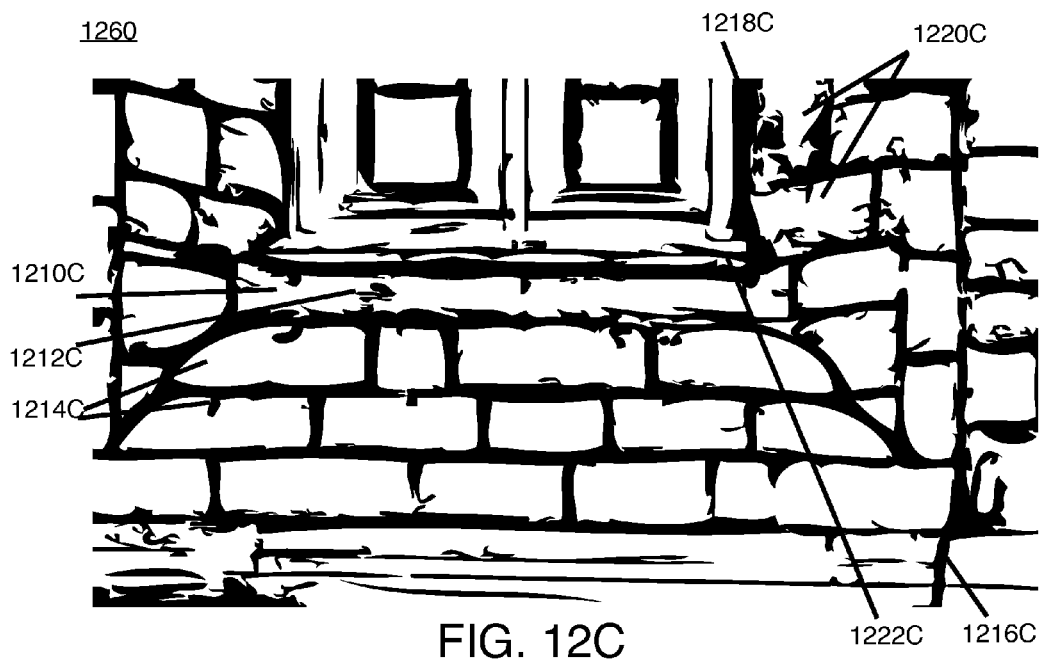
FIG. 12C shows a rendering in which areas of the rendering are filled to enhance the visibility of certain features of the object (e.g., produced in digital photo editing using one or more of finding edges, posterization, specifying pixel count or curve radii in lines or line thickness).
Figure 12D:
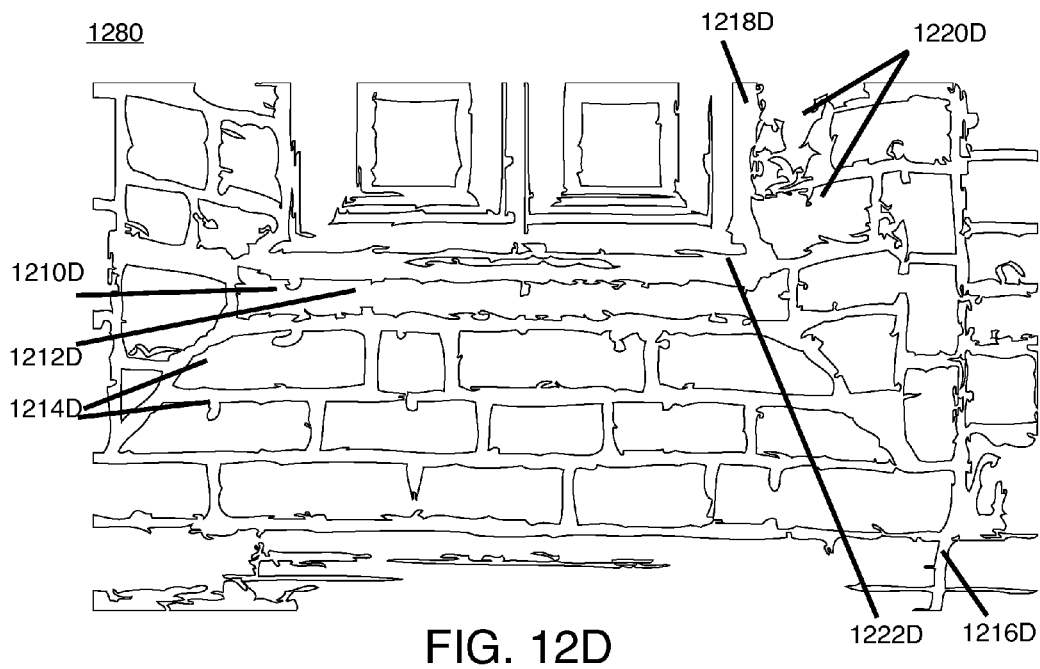
FIG. 12D shows a pen and ink style rendering which provides greater detail than FIG. 11, yet can still be reproduced as line art (e.g., a blueprint).

FIGS. 12C and 12D show alternate further processing of image 1220 from FIG. 12A with less detail preserved than FIG. 12B. It will be noted however that FIG. 12C preserves some of the visual detail of the stone texture 1212C, that both drawings lose most of the detail associated with the paint drops 1214C. Even here though on the visible portions 1214C marked on FIG. 12C (and associated structures on FIG. 12D), the anomaly in the stone facade is captured in the drawing. This available detail would cause one familiar with the art to inspect the object to determine what cause the anomaly in the resulting rendering. For a user such as a mason, masonry consultant or architect this is a valuable feature of the invention. Hence even at this level of detail the additional information retained has value.

Figure 13A:
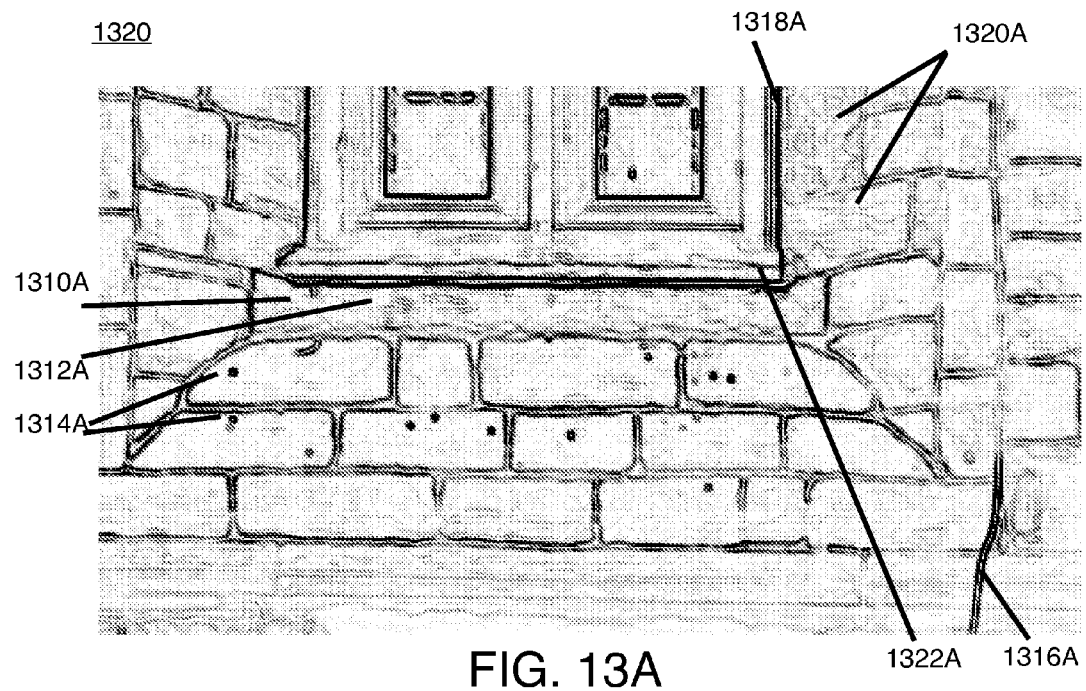
FIG. 13A shows a grayscale image of FIG. 10 after processing with a technique to find and enhance edges of contrast or texture change in FIG. 10, and then further processed to alter image density levels in highlights, midtones and shadow areas (e.g., reduce saturation of shadow, highlight contrast changes, increase saturation of shadow in highlight areas, reduce midtone saturation while holding shadow in midtones).

FIGS. 13A through 13F shows further processing of FIG. 10 image 1000 to retain more or less detail in the image of an object when preparing a photogrammetric rendering. FIG. 13A is another result of processing image 1000 of FIG. 10 to grayscale retaining 8 levels of gray with more detail available in the shadow.

FIGS. 13B through 13F show the benefits of the combination of photogrammetric correction and graphic arts process that are not true rendering process (e.g. ones that are photographic in presentation style rather than pen and ink drawing styled). Drawings 13B through 13F processing of the image in FIG. 10 to levels that allow reproduction of the image on equipment that is capable of producing less and less detail. For example FIG. 13A is still an 8 level grayscale image with very fine detail in the shadows of the original photo still showing e.g. stone texture, and will only reproduce well on an higher end photocopier or laser printer or by traditional printing methods such as lithography. It is not suitable for blueprint or line art reproduction techniques. Image 1320 in FIG. 13A was produced from image 1000 in FIG. 10 with the graphic arts processes of finding edges of contrast change, discarding color information by converting to continuous tone grey scale, adjusting shadow contrast, and reducing to 8 levels of grey. As can be seen the result clearly show stone surfaces and textures.

Figure 13B:
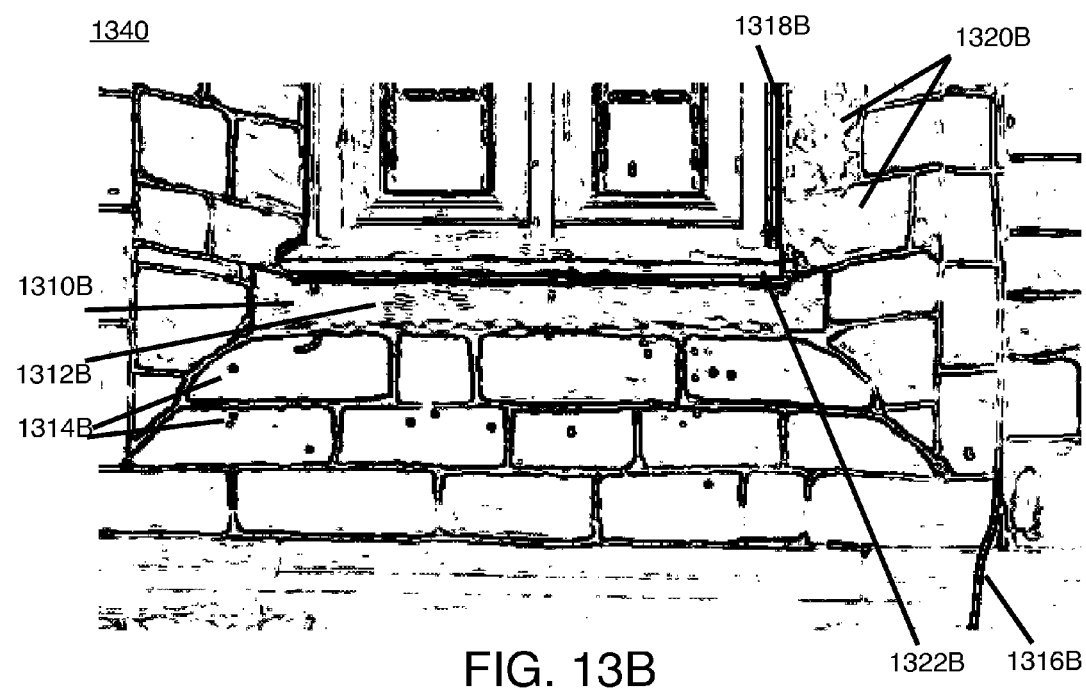
FIG. 13B shows further processing of FIG. 13A to reduce the image from continuous tone to a small limited number to color levels and then to further reduce the prior result to 1 bit color (e.g., reducing gray levels to 4 and then converting all gray levels to solid black). This figure is highly suitable for reproduction as one color line art (e.g., blueprints).

FIG. 13B shows FIG. 13A as processed by adjusting the tonal balance to enhance edge definition of the mortar in the masonry facade, reducing grays to 4 levels and equalizing the remaining levels grey to one level, namely black. The resulting image is effectively line art (e.g. 1 bit color) reproducible in one color even as a blueprint. Note the retained detail on the stone texture 1312B, the paint drops 1314B, and the clarity that 1318B is wood framing. This FIG. 13B demonstrates the clear hallmark of the invention which is retention of image detail and elimination of undesired detail in a photogrammetric rendering that can be reproduced as one color line art (e.g., in identical fashion to blueprints used in the AEC industry).

Figure 13C:
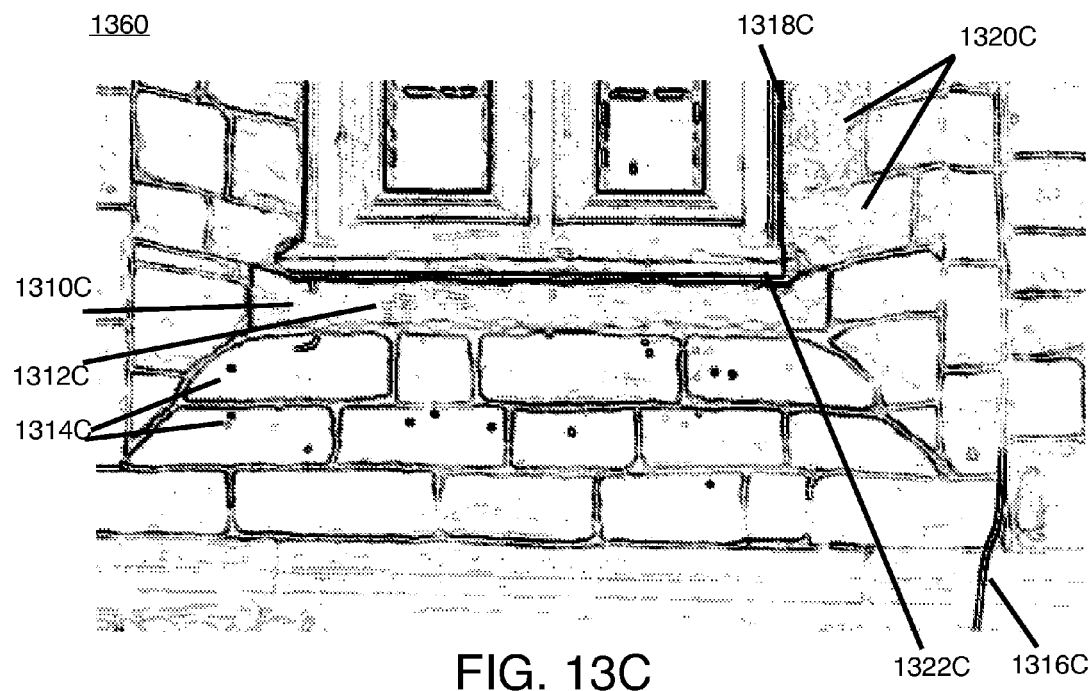
FIG. 13C shows FIG. 10 with further reduction of highlight image density levels as comparable to FIG. 13A prior to reducing the number to levels to two, the same as that in FIG. 13B.

FIG. 13C shows the further processing of FIG. 13A down to 4 levels of gray. Less detail in available in this image that FIG. 13A and when further processed further to equalize all levels of gray to a single level the result is shown in FIG. 13D.

Figure 13D:
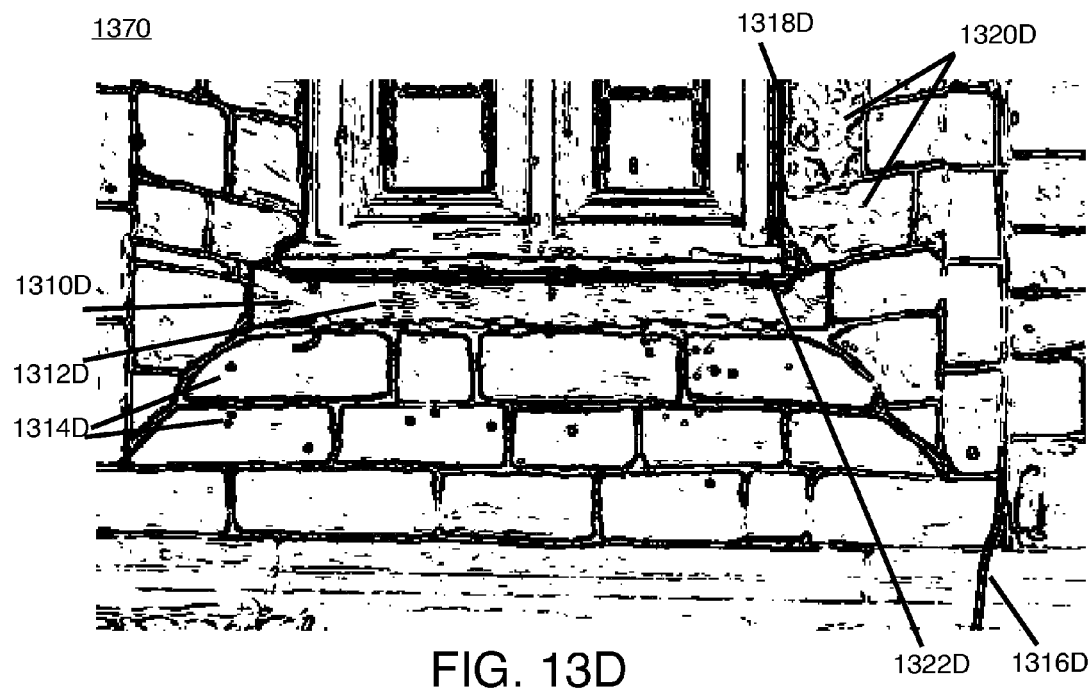
FIG. 13D shows FIG. 13C further processed to reduce the image to monochromatic 1 bit color by converting all gray levels to solid black.

FIG. 13D, while showing more detail of the stone texture 1312D, has more extraneous marks 1320D that may actually make the photogrammetric rendering less useful than the one shown in FIG. 13B for certain purposes. FIG. 13D demonstrates that in the case on one color line art style reproduction (e.g. 1 bit color) for blueprints too much information may be retained.

Figure 13E:
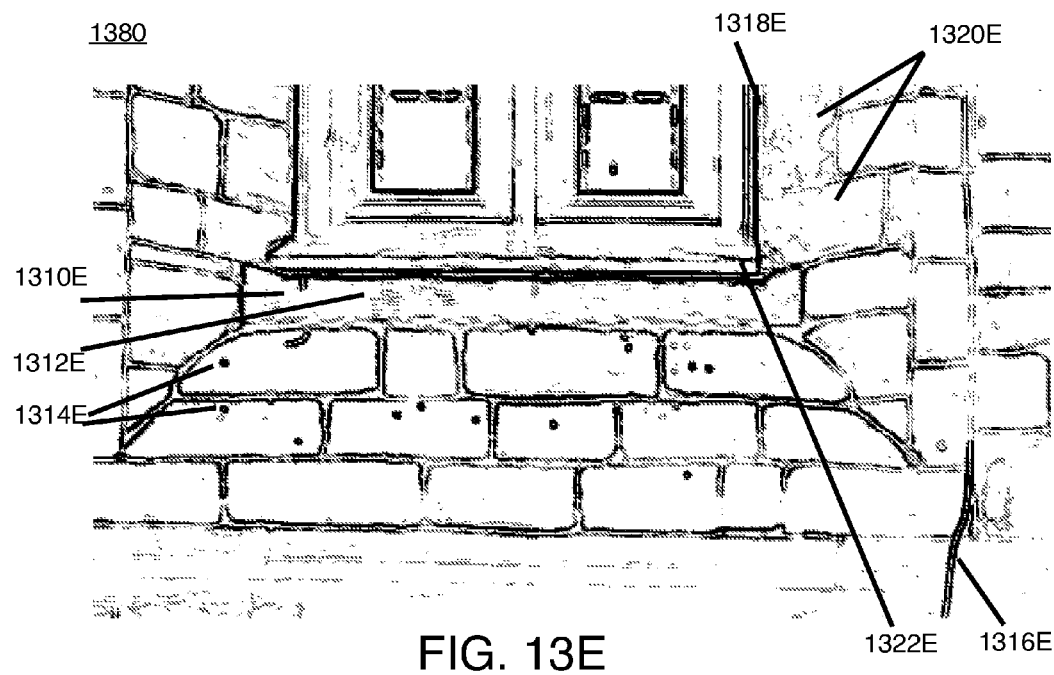
FIG. 13E shows processing similar to FIG. 13C but with a more limited number to levels of image density (e.g., shadow detail is almost non existent while minimal highlight detail is preserved with the main feature being changes in contrast or edges). Note the reduced level of available detail as compared to FIG. 13C.
Figure 13F:
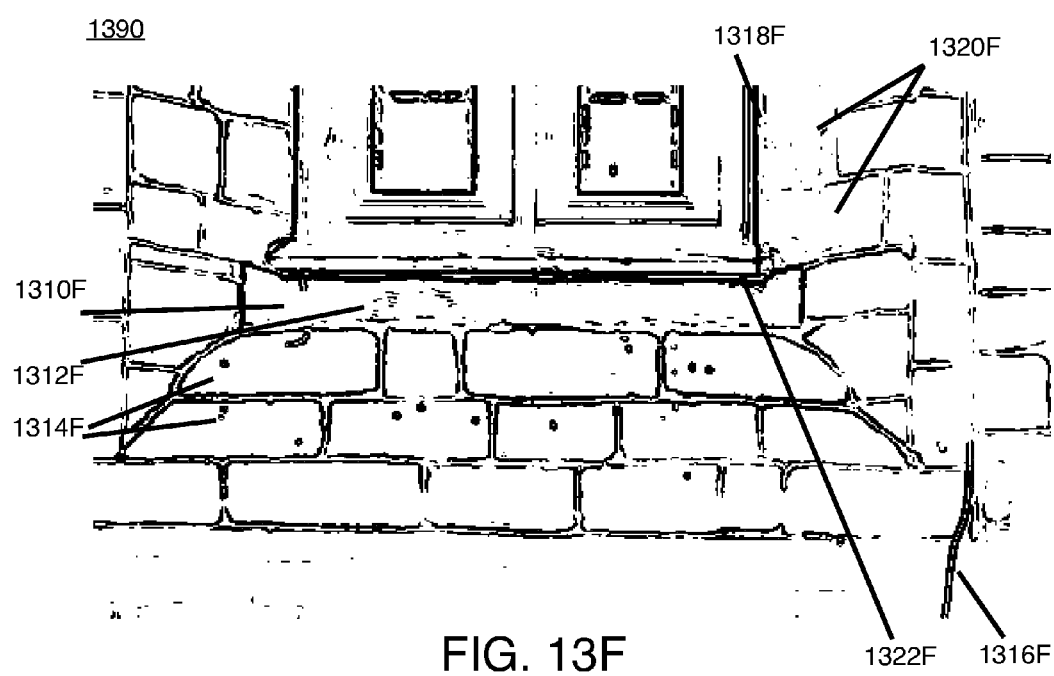
FIG. 13F shows processing similar to FIG. 13C, but with reduction to two levels of image density resulting in a monochromatic 1 bit color depth suitable for reproduction as line art (e.g., blueprint).

FIGS. 13E and 13F show processing of FIG. 10 to reduce the levels of gray to 3 and 2 respectively. Two levels of gray shown in FIG. 13F is equivalent to 1 bit color shown in FIG. 13B, but note the absence of detail in FIG. 13F as compared to FIG. 13B in the stone texture of the lintel 1312F, window wood frame 1318F, and stone texture 1320F. The differences between FIGS. 13B and 13F show the difference in the order of graphic arts processes applied and when applied and discussed previously in the embodiment 400 shown in FIG. 4.

Persons skilled in the art will appreciate that there are differing needs for retention or discard of information contained in an image depending upon the end users and intended uses of the image, e.g. an architect's or artist's stylistic presentation has different requirements from a masonry consultant's or mason's requirements. The flexible iterative system and process described in 400 becomes important to the invention.

FIG. 13E showing 3 levels of gray (e.g. black, 50% of black, and 0% or absent) would clearly be reproducible in satisfactory quality on a lower end printing equipment (e.g., photocopy machine or facsimile machine) without significant loss of detail in the image.

FIG. 14A shows the equivalent of a wire frame projection for an elevation view of an architectural design such as building (e.g. elevation drawing by an architect). An advantage of the invention is that images, e.g. photographs, with the defects illustrated in FIGS. 14B through 14G either individually, in the case of for example FIGS. 14B through 14F, or multiply, in the case of for example FIG. 14G, can be photogrammetriclly corrected and rendered.

Figure 14E:
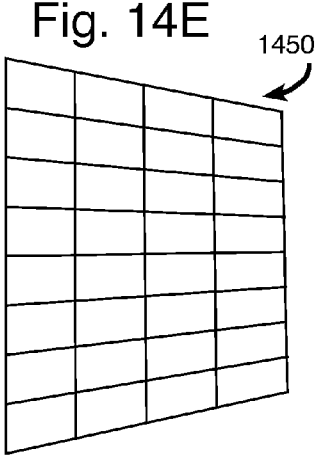
FIG. 14E shows skew effect in photography along the horizontal axis when the right side of the object being photographed is further sway from the film or image receptor plane than the left side.
Figure 14F:
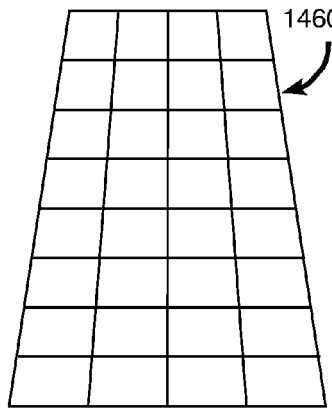
FIG. 14F shows skew effect in the vertical axis when the top is further than the bottom from the image receptor plane. This effect is usually called perspective effect to distinguish it from skew as described in FIG. 14E.
Figure 14G:
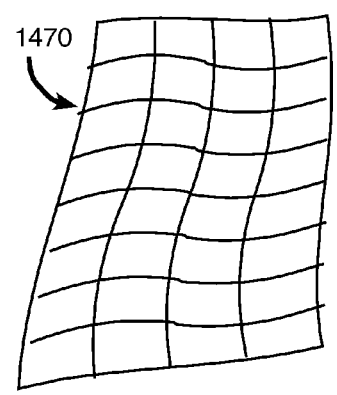
FIG. 14G shows a multiplicity of effects.

Perspective and skew defects which are demonstrated in 1460 of FIGS. 14F and 1450 of FIG. 14E respectively with the correction resulting as 1410 of FIG. 14A can be seen in image 600 of FIG. 6 prior to correction and image 700 of FIG. 7 after correction. Perspective and skew defects can occur, for example, where a face of an object such as a building wall being photographed and an image receptor plane are not parallel to each other, and in another example where the object of interest is not centered in the image receptor of a camera.

Less noticeable in image 500 of FIG. 5 is horizon misalignment where, for example, the object of interest and the camera image receptor plane are on differing horizontal horizons as demonstrated in 1440 of FIG. 14D. Horizon alignment defects 1440 of FIG. 14D may also be corrected to 1410 of FIG. 14A as shown in image 600 of FIG. 6.

Other defects in images may be introduced by the method of image capture such as photography when, for example, the camera itself, through the optics of the camera lens and image receptor system, introduces distortion into the image captured. Two common examples of camera induced distortion are barrel lens distortion (e.g., 1420 of FIG. 14B) and pin cushion distortion (e.g., 1430 of FIG. 14C). In both cases, increased distortion may exist further away from the center of the camera optics, at the outer edges of the image.

Camera induced defects can be partially mitigated, for example, by keeping the areas of interest of a photograph in the center and away from the edges of the image receptor, as can be seen in 1420 of FIG. 14B. It is an advantage of the invention to photogrammetrically correct such distortion so that a resulting renderings is analogous to the architectural elevation of 1410 of FIG. 14A.

Persons skilled in the art will appreciate that distortions in images to be photogrammetrically rendered are rarely found signally in original images to be processed as demonstrated in FIGS. 14B through 14F. In fact, image 500 is more analogous to 1470 showing a multiplicity of effects, and undergoing multiple serial processes to result in image 700 which is analogous to 1410. In fact, image 500 after being processed to image 600 was corrected for pin cushion effect 1430 prior to removal of perspective 1460 and skew 1450.

Persons familiar with the art will understand that the multiplicity of effects shown in FIGS. 14B through 14G, either individually or multiply (present as in the case of 1470 of FIG. 14G) may be corrected serially in any order to achieve the corrected image 1410 of FIG. 14A. Depending upon manual or computer aided processes, it may be desirable to proceed differently, and correct defects in a particular sequence depending upon both the original image and the desired end use image.

The consequent advantage of the various techniques described herein may include, for example: (a) use on non metric images for creation of scale renderings for the AEC industry, (b) conversion of non metric photographs to photogrammetric renderings (c) elimination of the need for specialize metric cameras and equipment, (d) retention of photographic or other original image detail in the photogrammetric rendering, (e) reduction of unnecessary detail in photographs to useful levels for the end user, (f) renderings reproducible by a variety of print production methods, (g) reduction of photographs to renderings capable of being reproduced using blueprint production methods, (h) Economic non contact quick non-labor intensive gathering of field information, (i) reduction of the need for or quantity of field measurements, (j) economic reproduction of photogrammetric renderings as blueprints, photo copies or laser prints instead of photographs or large format ink jet printing, and/or (k) rapid production of photogrammetric renderings.

Accordingly, the invention permits the delivery of photogrammetric renderings and/or documents containing photogrammetric images and other information to end users which said images and/or documents contain more information and are of greater user to end users than images and documents currently produced and provided in the AEC industry. In fact, information contained in photographs and images of object of interest to be processed may be fully or partially retained in a way to that the invention may achieve, for example: (a) it permits more information to be displayed visually to end users, (b) it allows end users to more easily locate on an object an area of interest in a document image and vice versa, (c) it allows end users with greater certainty to locate on an object areas of interest in a document image and vice versa, (d) it allows for more cost effective, less labor intensive, automated or semi-automated production of end user documents, and/or (e) it provides economic benefits to end users manifested through greater ease of use, greater certainty, and cost of production.

The scope of the invention extends beyond the AEC industry to cartography and other areas where the incorporation of additional visual information may enhance ease of use, certainty of the user about object attributes, user location, the environment or other issues of importance.

Inasmuch as the present invention is subject to many variations, modifications and changes in detail, it is intended that all subject matter discussed above or shown in the accompanying drawings be interpreted as illustrative only and not be taken as limiting in any sense.

From the foregoing description, persons skilled in the art will recognize that this invention provides photogrammetric rendering. In addition, persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof which are within the spirit of the following claims.

What is claimed is:

1. A method for producing a two-dimensional rendered drawing of an object, the method comprising:
   processing a non-metric image of the object to create an orthoimage;
   processing original surface texture data of the object from the orthoimage to generate as-is processed texture data that enhances one or more features of a first surface type of the object, wherein the as-is processed texture data is based entirely on the original surface texture data of the object; and
   generating the two-dimensional rendered drawing of the object that portrays the as-is processed texture data, wherein the rendered drawing preserves some detail related to the first surface type of the object while eliminating some detail related to a second surface type of the object.

2. The method of claim 1, wherein the processing the non-metric image of the object to create the orthoimage comprises correcting for a camera lens distortion.

3. The method of claim 1, wherein the processing the non-metric image of the object to create the orthoimage comprises at least one of a perspective correction, a skew correction, and an alignment correction.

4. The method of claim 1, wherein the processing the original surface texture data of the object from the orthoimage to generate the as-is processed texture data comprises:
   determining a tonal threshold of the orthoimage; and
   processing the original surface texture data by isolating the tonal threshold.

5. The method of claim 1, wherein the processing the original surface texture data of the object from the orthoimage to generate the as-is processed texture data comprises finding edges.

6. The method of claim 5, wherein the edges comprise at least one of regions of change in texture, regions of change in contrast, and regions of change in color.

7. The method of claim 5, wherein the finding edges comprises detecting at least one of regions of depth changes, regions of change in material properties, regions of surface orientation changes, and regions of change in illumination.

8. The method of claim 1, wherein the as-is processed texture data comprises texture detail that is reproducible as one-color art while still visually indicating the original surface texture data of the object.

9. The method of claim 1, wherein the eliminating some detail related to the second surface type of the object comprises at least one of erasure, masking, threshold cutoff, and tonal balance adjustment.

10. The method of claim 1, wherein the processing the original surface texture data of the object from the orthoimage and the generating the two-dimensional rendered drawing of the object are performed autonomously by a computer.

11. The method of claim 1, wherein the first surface type comprises a first material type and the second surface type comprises a second material type.

12. The method of claim 1, wherein the first and second surface types comprise identical material types.

* * * * *